(12) United States Patent
Shikada et al.

(10) Patent No.: US 6,361,757 B1
(45) Date of Patent: Mar. 26, 2002

(54) CATALYST FOR MANUFACTURING HYDROGEN OR SYNTHESIS GAS AND MANUFACTURING METHOD OF HYDROGEN OR SYNTHESIS GAS

(75) Inventors: Tsutomu Shikada; Yotaro Ohno; Norio Inoue; Masatsugu Mizuguchi; Keiji Tomura; Takeshi Furukawa; Takuya Kadowaki; Sadayoshi Iwabuchi; Takashi Ogawa; Masami Ono; Kaoru Fujimoto, all of Tokyo (JP)

(73) Assignee: NKK Corporation, Tokyo (JP)

( * ) Notice: Subject to any disclaimer, the term of this patent is extended or adjusted under 35 U.S.C. 154(b) by 0 days.

(21) Appl. No.: 09/319,530
(22) PCT Filed: Jun. 16, 1998
(86) PCT No.: PCT/JP98/02640
§ 371 Date: Jun. 4, 1999
§ 102(e) Date: Jun. 4, 1999
(87) PCT Pub. No.: WO99/17875
PCT Pub. Date: Apr. 15, 1999

(30) Foreign Application Priority Data

| Oct. 7, 1997 | (JP) | 9-274114 |
| Oct. 7, 1997 | (JP) | 9-274115 |
| Apr. 17, 1998 | (JP) | 10-106829 |
| Apr. 17, 1998 | (JP) | 10-106830 |
| Apr. 17, 1998 | (JP) | 10-106831 |
| Apr. 17, 1998 | (JP) | 10-106832 |
| Apr. 17, 1998 | (JP) | 10-106833 |

(51) Int. Cl.$^7$ .............. C01B 3/26; C22B 5/12; H01M 8/10; B01J 23/72; B01J 23/755
(52) U.S. Cl. .............. 423/651; 75/505; 75/958; 252/373; 422/188; 423/138; 429/30; 502/326; 502/345
(58) Field of Search .................. 75/505, 958; 252/373; 423/138, 650, 651, 652, 653; 502/326, 325, 345; 422/188; 429/30

(56) References Cited

U.S. PATENT DOCUMENTS 5,498,370 A * 3/1996 Bhattacharyya et al. ..... 252/373
5,980,840 A * 11/1999 Kleefisch et al. ........... 422/211

FOREIGN PATENT DOCUMENTS

JP 1-148343 * 6/1989 ............ B01J/23/76

* cited by examiner

Primary Examiner—Steven P. Griffin
Assistant Examiner—Maribel Medina
(74) Attorney, Agent, or Firm—Flynn, Thiel, Boutell & Tanis, P.C.

(57) ABSTRACT

This invention provides a catalyst for producing hydrogen gas from a mixed gas comprising dimethyl ether and water vapor or carbon dioxide gas, which comprises copper, iron, cobalt, palladium, iridium, platinum, rhodium, or nickel as an active component, and a method of producing synthesis gas or hydrogen gas in a high yield at a low temperature. By using the catalyst, a fuel cell, electricity generation, reduction of iron ore and the like can be carried out.

10 Claims, 4 Drawing Sheets

CATALYST FOR MANUFACTURING HYDROGEN OR SYNTHESIS GAS AND MANUFACTURING METHOD OF HYDROGEN OR SYNTHESIS GAS

TECHNICAL FIELD

The invention relates to a catalyst for producing hydrogen or synthesis gas from a mixed gas containing dimethyl ether and water vapor or carbon dioxide, and a manufacturing method of hydrogen or synthesis gas using the same.

BACKGROUND ART

Synthesis gas is composed of carbon monoxide and hydrogen, and has wide applications as a raw material for ammonia synthesis and various chemical products, as well as used directly as a raw material for methanol synthesis, oxo synthesis, Fischer-Tropsch synthesis and the like.

Heretofore, some methods of manufacturing synthesis gas and methods of manufacturing hydrogen utilizing them are known.

For example, there are (1) gasification of coal, (2) steam reforming of hydrocarbon using natural gas, LPG, naphtha or the like as the raw material, (3) partial oxidation of hydrocarbon using natural gas, LPG, naphtha, heavy-duty oil or the like as the raw material, and so on.

However, the above coal gasification of (1) has a problem that a very complex and expensive coal gasification oven is necessary, and the apparatus becomes a large scale plant. The steam reforming of the hydrocarbon of (2) has a problem that a special reforming oven is necessary because of requiring a high temperature of 700 to 1200° C. for the reaction to proceed due to its great endothermic reaction, and the catalyst to be used is required to have a high heat resistance. The partial oxidation of the hydrocarbon of (3) has a problem that a special partial oxidation oven is necessary because of requiring a high temperature of 1200 to 1500° C., the treatment of a large quantity of soot generated with the reaction proceeding is a problem, and in the case of using a catalyst, the catalyst is deteriorated by the deposition of a large quantity of carbonaceous material on the surface of the catalyst.

An object of the invention is to provide a catalyst and a manufacturing method capable of solving the problems of the above prior art, and obtaining hydrogen or synthesis gas in a high yield at a low temperature.

DISCLOSURE OF INVENTION

The inventors investigated eagerly in order to solve the above problems, and as a result, they noted dimethyl ether as the raw material gas. Then, they found that copper, iron, cobalt, palladium, iridium, platinum, rhodium and nickel are very effective as a catalyst for reacting dimethyl ether with water vapor or carbon dioxide to produce hydrogen or synthesis gas, and can produce hydrogen or synthesis gas efficiently at a low temperature to complete the invention.

Thus, the invention relates to a catalyst for producing hydrogen gas from a mixed gas comprising dimethyl ether and water vapor or carbon dioxide gas, which comprises copper, iron, cobalt, palladium, iridium, platinum, rhodium, or nickel as an active component, and a method of producing hydrogen or synthesis gas which comprises contacting a mixed gas comprising dimethyl ether and water vapor or carbon dioxide gas with the above catalyst.

Figure 1:
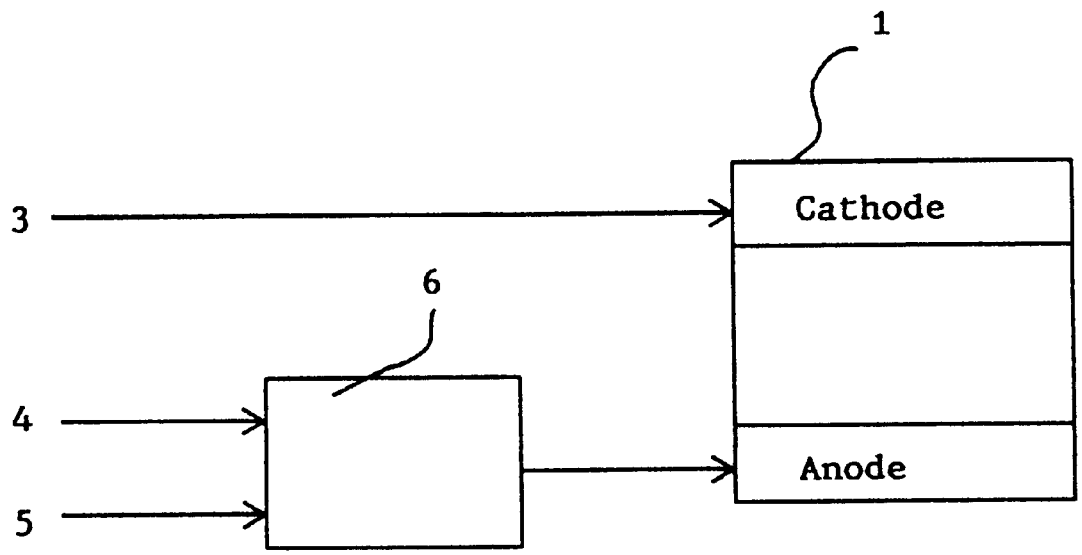
FIG. 1 illustrates a constitution of a fuel cell provided with a reformer using the catalyst of the invention.

1 Fuel cell
2 Solid electrolyte-type fuel cell
3 Air supply line
4 Dimethyl ether supply line
5 Water vapor supply line
6 Reformer (reforming reactor)
11 Sintering machine exhaust gas cooler
12, 13, 14 Heat exchanger
15 Reformer
16 Combustor
17 Compressor
18 Gas turbine
19 Electricity generator
20 Heat recovering boiler
21 Heat exchanger
22 Blower
23 Reformer
24 Heating furnace
25 Iron ore reducing furnace

BEST MODE FOR CARRYING OUT THE INVENTION

The catalyst of the invention is able to produce hydrogen gas from a mixed gas comprising dimethyl ether and water vapor or carbon dioxide, and comprises copper, iron, cobalt, palladium, iridium, platinum, rhodium or nickel as an active component.

Among the active components, cobalt, palladium, iridium, platinum, rhodium and nickel produce synthesis gas from dimethyl ether and water vapor, and copper, cobalt and palladium produce synthesis gas from dimethyl ether and carbon dioxide. That is, cobalt and palladium can produce synthesis gas from both water vapor and carbon dioxide. On the other hand, copper and iron produce mainly hydrogen when using water vapor.

The active component is incorporated in the catalyst in a form of a metal or compound. Preferable copper compounds are copper oxides, and the copper oxides are cuprous oxide ($Cu_2O$), cupric oxide (CuO) and their mixtures. Preferable iron compounds are iron oxides, and the iron oxides are ferrous oxide (FeO), ferric oxide ($Fe_2O_3$) and their mixtures. Preferable cobalt compounds are cobalt oxides, and the cobalt oxides are cobaltous oxide (CoO), cobaltic oxide ($Co_2O_3$) and their mixtures. Preferable palladium compounds are palladium oxides and chlorides, the palladium oxides are palladous oxide (PdO), palladium sesquioxide ($Pd_2O_3$), palladic oxide ($PdO_2$), and their mixtures, and the palladium chlorides are palladium dichloride ($PdCl_2$), palladium tetrachloride ($PdC_4$) and their mixtures. Preferable iridium compounds are iridium oxide and chloride, the iridium oxide is $IrO_2$, and the iridium chloride is $IrCl_3$.

Preferable platinum compounds are platinum oxides and chlorides. The platinum oxides are PtO and $PtO_2$, and the platinum chlorides are $PtCl_2$, $PtCl_3$ and $PtCl_4$. Preferable rhodium compounds are rhodium oxide and chloride. The rhodium oxide is $Rh_2O_3$, and the chloride is $RhCl_3$. Preferable nickel compounds are nickel sulfides, and the nickel sulfides are NiS, $Ni_3S_2$ or their mixtures.

The catalyst of the invention may be carried by a catalyst carrier. Preferable catalyst carriers are oxides, such as alumina, silica gel, silica alumina, zeolite, titania, zirconia, zinc oxide, tin oxide, lanthanum oxide and cerium oxide, and particularly, alumina is preferable because of high synthesis gas yield. The content in the catalyst is, in the case of copper, about 1 to 50 wt. %, preferably about 3 to 30 wt. %, in the case of iron, about 10 to 100 wt. %, preferably about 30 to 100 wt. %, in the case of cobalt, about 1 to 30 wt. %, prefearbly about 3 to 15 wt. %, in the case of iridium, platinum and rhodium, about 0.05 to 10 wt. %, preferably about 0.1 to 5 wt.%, and in the case of nickel, about 0.5 to 30 wt.%, preferably about 1 to 15 wt. %. When the content is out of the above range, the yield of hydrogen and synthesis gas is degraded.

The catalyst of the invention may be combined with other metals or compounds than the above metals or their compounds. Examples of the other metals and compounds are, in the case of a copper catalyst, zinc, chromium, nickel, manganese, tin, cerium, lanthanum and their compounds. The content of the above third component is 70 wt. % or less, particularly 50 wt. % or less, and in the case of incorporating, in general, about 1 to 30 wt. %.

In the case of an iron catalyst, examples of the other metals and compounds are zinc, nickel, chromium, manganese, tin, cerium, lanthanum and their compounds. Among them, oxides of zinc, nickel, chromium and manganese are preferred. The content of the above third component is 50 wt. % or less, particularly 30 wt. % or less, and in the case of incorporating, in general, about 1 to 20 wt. %. In the case of cobalt catalyst, examples of the other metals and compounds are metals of nickel and iron and their compounds. The content of the above third component is 20 wt. % or less, particularly 10 wt. % or less, and in the case of incorporating, in general, about 1 to 5 wt. %.

In the case of an iridium catalyst, platinum catalyst and rhodium catalyst, examples of the other metals and compounds are metals of copper, cobalt, nickel and iron and their compounds. The content of the above third component is 20 wt. % or less, particularly 10 wt. % or less, and in the case of incorporating, in general, about 1 to 5 wt. %.

In the case of a nickel catalyst, examples of the other metals and compounds are metals and/or compounds of copper, cobalt and iron. The content of the above third component is 20 wt. % or less, particularly 10 wt. % or less, and in the case of incorporating, in general, about 1 to 5 wt. %.

The above third components may be incorporated as a single material, or two or more types thereof may be mixed and incorporated.

It is preferable that the palladium catalyst is carried by a metal oxide having a basicity. The metal oxide having a basicity is an alkali metal oxide, such as $Li_2O$, $Na_2O$, $K_2O$, $Rb_2O$ or $CS_2O$, alkaline earth metal oxide, such as BeO, MgO, CaO, SrO or BaO, rare earth element oxide, such as $Y_2O_3$, $La_2O_3$ or $CeO_2$, ZnO, $SnO_2$, $ZrO_2$, $Al_2O_3$, $TiO_2$ and a mixture of two or more of the above metal oxides. The metal oxide having a basicity may be combined with another metal oxide not having a basicity, such as silica gel, or another compound not having basicity, such as silicon carbide or activated carbon. The carrying rate of palladium is about 0.1 to 30 wt. %, preferably 0.2 to 20 wt. % of the metal oxide having a basicity. When the carrying rate of palladium is less than about 0.1 wt. % or more than about 30 wt. %, the yield of synthesis gas is degraded.

By using the metal oxide having a basicity as the carrier of palladium, which is an active component, synthesis gas can be produced in a high yield with restraining the production of hydrocarbons, mainly methane.

It is also effective to combine a solid acidic compound with the palladium-carried metal oxide, and by using the catalyst, synthesis gas can be produced from dimethyl ether and water vapor. The catalyst is made by physically mixing palladium carried by the metal oxide and a compound having a solid acidity.

The metal oxide used for carrying palladium is silica gel, titania, alumina, silica-alumina, zirconia, tin oxide, zinc oxide or the like, and particularly, silica gel and titania are preferable because of high synthesis gas yield. The palladium carried by the metal oxide is about 0.05 to 30 wt. %, preferably about 0.1 to 20 wt. % of the metal oxide. When the carrying rate of palladium is less than about 0.05 wt. % or more than about 30 wt. %, the yield of synthesis gas is degraded. To one side of the catalyst components constituting the catalyst of the invention, other metal(s) than palladium or compound(s) thereof can be combined. Examples of the other metal(s) and compound(s) are alkali metal oxides, such as $Li_2O$, $Na_2O$, $K_2O$, $Rb_2O$ and $Cs_2O$, alkaline earth metal oxides, such as BeO, MgO, CaO, SrO and BaO, rare earth element oxides, such as $Y_2O_3$, $La_2O_3$ and $CeO_2$, and mixtures of two or more of the above metal oxides. The content of the above third component is 20 wt. % or less, particularly 10 wt. % or less, and in the case of incorporating, in general, about 1 to 5 wt. %.

The compounds having a solid acidity are alumina, silica.alumina, silica.titania, zeolite, aluminum phosphate and the like, and alumina is particularly preferred because of high synthesis gas yield.

In the catalysis, by the catalytic action of the compound having solid acidity, dimethyl ether is hydrolyzed to produce methanol (formula (1)), and subsequently, produced methanol is contacted with the palladium-carried metal oxide catalyst to produce synthesis gas by decomposing the methanol (formula(2)). By mixing the above two types of catalysts physically, synthesis gas can be obtained in a high yield.

$$CH_3OCH_3 + H_2O \rightarrow 2CH_3OH \tag{1}$$

$$CH_3OH \rightarrow CO + 2H_2 \tag{2}$$

To the production of the above respective catalysts, general preparations of these type catalysts can be applied. For example, an inorganic acid salt, such as a nitrate, carbonate or halide, or an organic acid salt, such as an acetate or oxalate, as the compound of the catalytic activity component metal, can be used as the raw material for producing the catalyst. For the deposition of the active component onto the catalyst carrier, usual techniques, such as precipitation, kneading, impregnation and ion-exchange method, can be utilized. The catalyst composition thus produced is optionally sintered by a conventional method. The sintering is preferably conducted by heating at 300 to 800° C. for 1 to 10 hours in a nitrogen or air atmosphere.

Moreover, the catalyst is preferably activated before subjected to the reaction, and in the case of a metal catalyst, it is preferable to treat at 300 to 600° C. for 1 to 10 hours in a hydrogen atmosphere. On the other hand, the previous activation treatment is not necessary for oxide catalysts. In the case of sulfides, it is preferable to treat at 300 to 600° C. for 1 to 10 hours in a hydrogen atmosphere containing 1 to 50% of hydrogen sulfide ($H_2S$), dimethyl sulfide ($CH_3SCH_3$) or dimethyl disulfide ($CH_3SSCH_3$).

Upon making nickel into a sulfide, the sulfidation may be carried out according to a conventional method, and it is preferable to heat at 300 to 600° C. for 1 to 10 hours in an atmosphere of one of hydrogen sulfide, dimethyl sulfide, dimethyl disulfide or carbon disulfide or a mixed gas of two or more of them or a mixed gas of the above and hydrogen. A suitable mixing ratio of hydrogen and the above sulfur compound is about 1:0.05 to 1:1.

Upon manufacturing a catalyst of palladium carried by a metal oxide having a basicity, the basicity of the metal oxide having a basicity is lost by contacting with a strongly acidic aqueous solution containing palladium. Thereupon, the manufacturing of the catalyst is characterized by treating with a basic aqueous solution, after palladium is carried by the metal oxide, in order to recover the basicity of the metal oxide. By this treatment, synthesis gas can be obtained in a high yield. That is, it is characterized that, after palladium is carried by the metal oxide having a basicity, it is treated with a basic aqueous solution. As the manufacture of the catalyst, a metal oxide having a basicity is added to an aqueous solution containing a metal salt of palladium, such as palladium chloride, evaporated to dryness, dried, followed by sintering. The sintering is preferably carried out by heating at 350 to 600° C. for 1 to 10 hours in nitrogen or air. Subsequently, this matter is treated with a basic aqueous solution. As the basic aqueous solution, aqueous solutions of hydroxides or carbonates of alkali metals and hydroxides of alkaline earth metals can be listed. A suitable concentration the basic compound is about 0.5 to 20, usually about 1 to 10. The treatment is carried out by contacting the catalyst with the basic aqueous solution, followed by removing the basic aqueous solution. This treatment is preferably carried out at an ordinary temperature to 80° C. for 1 to 5 hours. Besides, it is possible that, after being treated with the basic aqueous solution, for example, a small amount (e.g. about 0.1–1.0) of the above basic compound is deposited. The catalyst is activated in the final stage of preparation, and the activation is preferably carried out by treating at 350 to 600° C. for 1 to 10 hours in a hydrogen atmosphere.

To the production of the palladium-carried metal oxide catalyst in the catalyst containing the palladium-carried metal oxide and the solid acidic compound, general preparations of this type catalyst can be applied. For example, an inorganic acid salt, such as a nitrate, carbonate or halide, or an organic acid salt, such as palladium acetate or palladium oxalate, can be used as the palladium compound of the raw material for producing the catalyst. For the deposition of palladium onto the metal oxide carrier, usual techniques, such as precipitation, kneading, impregnation and ion-exchange method, can be utilized. The catalyst composition thus produced is optionally sintered by a conventional method. The sintering is preferably conducted by heating at 300 to 600° C. for 1 to 10 hours in a nitrogen or air atmosphere. Subsequently, the catalyst composition is preferably treated at 300 to 600° C. for 1 to 10 hours in a hydrogen atmosphere.

As to the mixing of the palladium-deposited metal oxide and the solid acidic compound, either way may be taken, i.e. both components are pelletized and then mixed with each other physically, or both components are pulverized, mixed physically and then, pelletized by compression molding. The mixing ratio of both components is not especially limited, but selected according to the type of each component, reaction conditions and the like. Usually, the ratio is about 1:10 to 10:1, preferably about 1:5 to 5:1, as a weight ratio.

Hydrogen or synthesis gas can be obtained in a high yield by streaming a mixed gas of dimethyl ether and water vapor or carbon dioxide through each of the above catalyst thus prepared.

In the invention, water vapor or carbon dioxide is supplied together with dimethyl ether which is the raw material. The supply amount, in the case of water vapor, is the theoretical amount or more, and in the case of producing synthesis gas, the supply amount is 1 to 20 times, preferably 1 to 10 times, in molar quantity. On the other hand, in the case of producing hydrogen, the supplied amount is 1 to 30 times, preferably 1 to 20 times, in molar quantity. When the supply of water vapor is less than one molar quantity, a high dimethyl ether conversion rate cannot be obtained. A supply exceeding 20 times or 30 times is uneconomical. On the other hand, the supply amount, in the case of carbon dioxide, is 0.8 to 2.0 times, preferably 0.9 to 1.5 times, the molar quantity of dimethyl ether which is the raw material. When the supply of carbon dioxide is less than 0.8 time the molar quantity, high dimethyl ether conversion rate cannot be obtained. Exceeding 20 times the molar quantity is also undersirable because of the necessity of removing carbon dioxide which remains abundantly in the produced gas. It is a matter of course that carbon dioxide is combined with water vapor. The raw material gas can contain other component(s) than dimethyl ether and water vapor or carbon dioxide. In the case of using carbon dioxide, the molar ratio of $H_2$ is raised by adding water vapor as the other component.

Particularly, in the case of the catalyst using cobalt as an active component and of the catalyst of palladium carried by a metal oxide having a basicity, water vapor and/or carbon dioxide is supplied together with dimethyl ether which is the raw material. The supply amount in the case of supplying one of water vapor or carbon dioxide is the same as above. On the other hand, in the case of supplying both water vapor and carbon dioxide, the total of water vapor and carbon dioxide is 1 to 10 times, preferably 1 to 5 times, the molar quantity of dimethyl ether. When the total of water vapor and carbon dioxide is less than one, a high dimethyl ether conversion rate cannot be obtained. Exceeding 10 times the molar quantity is also undesirable because its uneconomical and the necessity of removing carbon dioxide.

The raw material gas may contain other component(s) than dimethyl ether and water vapor, carbon dioxide. It can contain inactive gases to the reaction, such as nitrogen, an inert gas, CO, $H_2$ or methane as the other component(s). A suitable content of them is 30 vol. % or less, and exceeding the range induces a problem of decreasing the reaction rate. It is desirable to remove air (oxygen) as much as possible because of burning dimethyl ether, and an allowable content is 5% or less as air.

The reaction temperature is, in the case of supplying dimethyl ether and water vapor to produce synthesis gas, 200° C. or more, preferably 250° C. or more, particularly preferably 300° C. or more, and 600° C. or less, preferably 500° C. or less, more preferably 450° C. or less, particularly preferably 400° C. or less. In the case of supplying dimethyl ether and carbon dioxide to produce synthesis gas, the reaction temperatures is 200° C. or more, preferably 250° C. or more, particularly preferably 300° C. or more, and 600° C. or less, preferably 500° C. or less, particularly preferably 450° C. or less. In the case of supplying dimethyl ether and water vapor to produce hydrogen, the reaction temperature is 150° C. or more, preferably 200° C. or more, particularly preferably 250° C. or more, and 500° C. or less, preferably 450° C. or less, particularly preferably 400° C. or less. The catalyst containing copper, platinum or palladium as an active component has a great low temperature activity. In a reaction temperature lower than the above range, high dimethyl ether conversion rate cannot be obtained, and the production rate of carbon dioxide increases to decrease the yield of hydrogen and synthesis gas. In a reaction temperature higher than the above range, in the case of producing synthesis gas, the production of hydrocarbons, mainly methane, is remarkable, and the rate of hydrogen and synthesis gas in the product is decreased, and therefore, undesirable. In the case of producing hydrogen gas, the rate of produced methanol and carbon monoxide as by-products increases in the reaction temperature higher than the above range to decrease the yield of hydrogen. Particularly, in the case of a copper catalyst, the grain growth of copper, which is the active component is remarkable in decreasing the catalytic activity gradually, and therefore, undesirable.

The reaction pressure is preferably ordinary pressure to 10 kg/cm$^2$. When the reaction pressure exceeds 10 kg/cm$^2$, the conversion rate of dimethyl ether decreases.

A preferable space velocity (supply velocity m$^3$/h of the mixed gas in the standard conditions per 1 m$^3$ catalyst) is, in the case of the production of synthesis gas, 1,000 to 20,000 m$^3$/m$^3$·h, in the case of the production of hydrogen, 1,000 to 50,000 m$^3$/m$^3$·h, particularly 30,000 m$^3$/m$^3$·h or less. When the space velocity is greater than the above range, the conversion rate of dimethyl ether decreases. On the other hand, a space velocity smaller than the above range is uneconomical, because the size of a reactor is very large.

In the method of the invention, the apparatus may be either a fixed bed or a fluidized bed.

In the case of producing synthesis gas by using the catalyst of the invention, as to the cobalt catalyst, the conversion rate of dimethyl ether is about 70 to 100%, usually about 80 to 100%, and synthesis gas can be obtained in a yield of about 70 to 100%, usually about 80 to 95%. The H$_2$/CO ratio of the produced synthesis gas is about 0.5 to 4, usually about 0.6 to 3 as a molar ratio. As to by-products, methanol is 2 or less, usually 1 or less, and hydrocarbons are 20 or less, usually 10 or less.

As to the palladium-carried basic metal oxide catalyst, the conversion rate of dimethyl ether is about 60 to 100%, usually about 80 to 100%, and synthesis gas can be obtained in a yield of about 60 to 100%, usually about 80 to 100%. As to by-products, methanol is 1.0 or less, usually 0.5 or less, and hydrocarbons are 10 or less, usually 5 or less.

As to the iridium catalyst, the conversion rate of dimethyl ether is about 60 to 100%, usually about 70 to 100%, and synthesis gas can be obtained in a yield of about 60 to 95%, usually about 70 to 95%. As to by-products, methanol is 10% or less, usually 5% or less, and hydrocarbons are 20% or less, usually 10% or less.

As to the platinum catalyst, the conversion rate of dimethyl ether is about 60 to 100%, usually about 70 to 100%, and synthesis gas can be obtained in a yield of about 50 to 90%, usually about 60 to 80%. As to by-products, methanol is 20% or less, usually 10% or less, and hydrocarbons are 5% or less, usually 5 or less.

As to the rhodium catalyst, the conversion rate of dimethyl ether is about 50 to 100%, usually about 60 to 90%, and synthesis gas can be obtained in a yield of about 50 to 90%, usually about 60 to 80%. As to by-products, methanol is 10% or less, usually 5% or less, and hydrocarbons are 20% or less, usually 10% or less.

As to the catalyst composed of a palladium-carried metal oxide and a solid acidic compound, the conversion rate of dimethyl ether is about 50 to 100%, usually about 60 to 100%, and synthesis gas can be obtained in a yield of about 40 to 90%, usually about 50 to 90%. As to by-products, methanol is 20% or less, usually 5% or less, and hydrocarbons are 20% or less, usually 5% or less.

As to the nickel catalyst, the conversion rate of dimethyl ether is about 60 to 95%, usually about 70 to 90%, and synthesis gas can be obtained in a yield of about 50 to 95%, usually about 40 to 90%. As to by-products, methanol is 10% or less, usually 5% or less, and hydrocarbons are 20% or less, usually 5% or less.

As to the copper catalyst using carbon dioxide, the conversion rate of dimethyl ether is about 50 to 100%, usually about 70 to 95%, and synthesis gas can be obtained in a yield of about 50 to 100%, usually about 70 to 95%. The H$_2$/CO ratio of the produced synthesis gas is about 0.6 to 1.3, usually about 0.8 to 1.1 as a molar ratio. As to by-products, hydrocarbons are 5% or less, usually 2% or less.

In the case of producing hydrogen, as to the copper catalyst, the conversion rate of dimethyl ether is about 60 to 100%, usually about 80 to 100%, and hydrogen can be obtained in a yield of about 55 to 100%, usually about 80 to 95%. As to by-products, methanol is 10 or less, usually 5 or less, hydrocarbons are 0.5 or less, usually 0.3 or less, and carbon monoxide is 10 or less, usually 5 or less.

As to the iron catalyst, the conversion rate of dimethyl ether is about 80 to 100%, usually about 90 to 100%, and hydrogen can be obtained in a yield of about 70 to 100%, usually about 80 to 100%. As to by-products, methanol is 0.5 or less, usually 0.3 or less, hydrocarbons are 5 or less, usually 2 or less, and carbon monoxide is 10 or less, usually 5 or less.

The hydrogen and synthesis gas produced from dimethyl ether using the catalyst of the invention can be used in a fuel cell.

Recently, electricity generation by fuel cell has been noted, because of less environmental pollution, less noise, less energy loss and advantages in setting and operation.

Since a fuel cell is, in principle, an energy converter converting the chemical energy of hydrogen, which is fuel gas, directly to electric energy, a stable supply of a large quantity of hydrogen is necessary. The supply of a large quantity of hydrogen is carried out using city gas containing hydrocarbons, such as methane or natural gas, propane, butane or petroleum gas, naphtha, kerosene, gas oil or synthetic petroleum oil or hydrogen, as a principal component, or methanol, as the raw fuel material, and reforming them to hydrogen and carbon dioxide gas or carbon monoxide by a reformer, as described in Japanese Patent KOKAI 7-48101.

In the case of using the raw fuel material for a portable electric source of an electric car or fuel cell for electricity generation plant located at a far place where city gas cannot be utilized, preferable raw fuel materials are liquids and easily liquefiable materials, such as propane, butane, naphtha, kerosene, gas oil, synthetic petroleum oil and methanol, in terms of transportation, storage place, safety and the like. However, in the case of using a heavy-duty hydrocarbon, such as propane, butane, naphtha, kerosene, gas oil or synthetic petroleum oil, there is a problem of a decreasing reforming efficiency due to the deposition of carbon on the catalyst surface during reforming, unless the setting of reformer conditions is carefully controlled. Methanol containing oxygen has no problem of carbon deposition, but corrosion of the reformer is a problem because of producing formic acid exhibiting strong corrosive action in the reforming process.

On the other hand, a national project is being scheduled, wherein dimethyl ether, which is clean, not containing ashes and sulfur, and excellent in handling, is mass-produced cheaply from poor grade coals, and utilized for fuel. Dimethyl ether is expected to be utilized for new applications, such as fuel cells, in view of transportation, storage place, safety and the like, and also in view of environmental protection, due to its easy liquefaction by pressuring at several atmospheric pressures.

Heretofore, the applying of dimethyl ether to fuel cells has not been reported yet.

The inventors investigated whether dimethyl ether can be reformed without a problem as a fuel gas by a reformer for reforming conventional raw fuel materials for fuel cells to fuel gases or not.

A comparison of the composition of the reformed gas with natural gas (methane) is shown in Table 1.

It can be seen that dimethyl ether can be reformed to hydrogen, carbon monoxide and water vapor even using a conventional reformer, similar to natural gas.

Accordingly, dimethyl ether can be utilized as a raw material for fuel cell without a problem.

TABLE 1

| Raw Fuel Material | $H_2O$ | $H_2$ | CO | Others |
|---|---|---|---|---|
| Dimethyl ether | 27.3 | 47.6 | 12.6 | 12.5 |
| Methane | 29.2 | 51.1 | 9.1 | 10.6 |

Unit; vol. %

In the case of a solid electrolyte-type fuel cell, it is already known that the cost of the solid electrolyte-type fuel cell is reduced by supplying methane and water vapor as the fuel gas directly to a fuel electrode (anode) to be reformed in the cell without passing a reformer, due to its high operation temperature of about 1,000° C. However, electricity generation is also possible without a problem of supplying a mixed gas containing dimethyl ether and water vapor directly as the fuel gas.

A constitution of a fuel cell provided with a reformer is shown in FIG. 1. In the figure, 1 is a fuel cell, 3 is an air supply line, 4 is a dimethyl ether supply line, 5 is a water vapor supply line, and 6 is a reformer, respectively.

Electricity generation can be conducted by using dimethyl ether as the raw material, supplying it to the reformer 6 together with water vapor to be reformed to hydrogen and carbon monoxide or carbon dioxide, and then, supplying it to the anode of the fuel cell and air which is the oxidizing agent to the cathode of the fuel cell 1.

Figure 2:
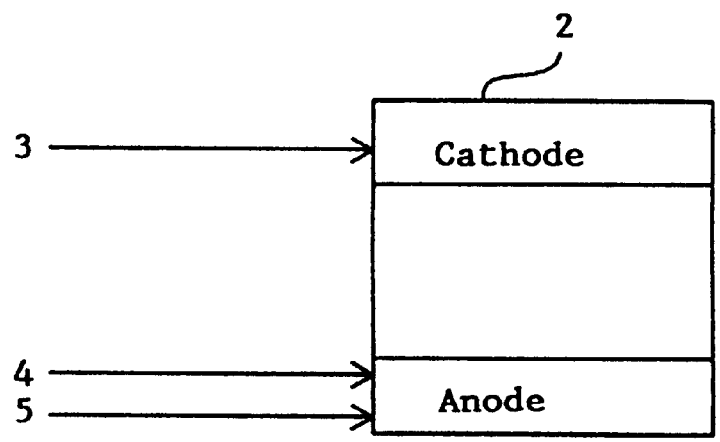
FIG. 2 illustrates a constitution of a solid electrolyte-type fuel cell using dimethyl ether or hydrogen.

A constitution of a solid electrolyte-type fuel cell is shown in FIG. 2. In the figure, 2 is a solid electrolyte-type fuel cell.

When a mixed gas containing dimethyl ether and water vapor is supplied directly to the anode of the solid electrolyte-type fuel cell 2 without passing a reformer, dimethyl ether 4 is reformed at the anode to hydrogen and carbon monoxide or carbon dioxide, etc. due to contacting with an electrode material having catalytic action at a high temperature near 1,000° C. Accordingly, electricity generation can be conducted by supplying air which is the oxidizing agent to the cathode of the solid electrolyte-type fuel cell 2.

It is no problem that the mixed gas containing dimethyl ether and water vapor contains an inactive gas, such as argon.

Electricity can be generated by reforming dimethyl ether using the catalyst of the invention to produce synthesis gas or hydrogen gas, and using the gas as the fuel for engine.

Heretofore, some methods of generating electricity using dimethyl ether are known.

For example, Japanese Patent KOKAI 2-9833 and 3-52835 disclose electricity generation methods by producing a combination of dimethyl ether and methanol from synthesis gas, storing them, and using them in an integrated gasification complex cycle electricity generation plant at the peak of natural gas electricity generation.

On the other hand, an electricity generation method using methanol reformed gas is known. The method obtains the synthesis gas or hydrogen gas used as a fuel for electricity generation by reforming or cracking of methanol.

In the methanol reforming electricity generation method, a method of carbureting (increasing heat) is also proposed by utilizing the exhaust gas of turbines for electricity generation or combustion exhaust gas for the reforming or cracking which is an endothermic reaction. For example, Japanese Patent KOKAI 62-132701 discloses a heat recovering method which utilizes the heat quantity of combustion exhaust gas for heating raw materials. The exhaust gas is from a heat medium-heating furnace for supplying the heat necessary for the reaction to proceed and heating raw gas materials to evaporation, in a methanol cracking apparatus for producing synthesis gas from methanol and water.

However, in the electricity generation method disclosed in Japanese Patent KOKAI 2-9833 and 3-52835, there is no description concerning specific electricity generation method at all.

Moreover, in the methanol reforming electricity generation method, the electricity generation efficiency is improved by carbureting (increasing heat) using the waste heat of the exhaust gas of turbines for electricity generation or combustion exhaust gas for reforming or cracking of raw methanol material. However, the heat quantity recoverable through steam reforming of the methanol and methanol cracking is not so great as shown in the formulas (1) and (2), respectively.

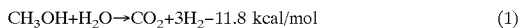

$$CH_3OH+H_2O \rightarrow CO_2+3H_2-11.8 \text{ kcal/mol} \quad (1)$$

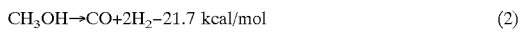

$$CH_3OH \rightarrow CO+2H_2-21.7 \text{ kcal/mol} \quad (2)$$

Besides, there are problems of careful handling and the like, because methanol has a toxicity.

The inventors noted the method of obtaining synthesis gas or hydrogen gas by reforming dimethyl ether which has been developed by the inventors, and devised an electricity generation method using the gas as fuel for an engine.

This method is an electricity generation method using dimethyl ether reformed gas which comprises reforming dimethyl ether to produce synthesis gas or hydrogen gas by adding water vapor or carbon dioxide gas to dimethyl ether, followed by catalyzing, and using the gas as a fuel for an engine, and uses an electricity generation apparatus comprising a reformer packed with a catalyst for reacting dimethyl ether with water vapor or carbon dioxide gas to produce synthesis gas or hydrogen gas, a combustor for burning the synthesis gas or hydrogen gas, and an electricity generator having a gas turbine rotating by the combustion exhaust gas generated in the combustor.

In the reforming reaction relating to the invention, the heat quantity of the endothermic reaction is great as shown in the formulas (3)–(5), and accordingly, it is possible to recover waste heat 1.5 to 2.5 times as in much as the conventional methanol reforming reaction, and the heat quantity upon burning the reformed gas increases by the recovered heat quantity.

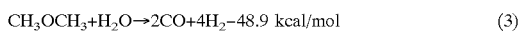

$$CH_3OCH_3+H_2O \rightarrow 2CO+4H_2-48.9 \text{ kcal/mol} \quad (3)$$

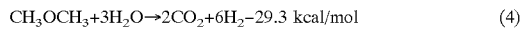

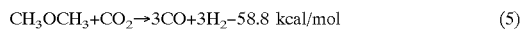

For example, when 1 $Nm^3$ dimethyl ether having a gross calorific value of 15,580 kcal/Nm3 is reformed by water vapor according to the formula (3), a synthesis gas consisting of 2 $Nm^3$ carbon monoxide and 4 $Nm^3$ hydrogen is obtained. The gross calorific value of the synthesis gas is 18,240 kcal, and the increase of heat quantity is 2,660 kcal. The rate of heat quantity increase (the increase of heat quantity is divided by the gross calorific value of dimethyl ether, and multiplied by 100) is calculated as 17.1%. On the other hand, in the methanol reforming reaction, when 1 $Nm^3$ methanol vapor having a gross calorific value of 8,150 $kcal/Nm^3$ is cracked, for example, according to the formula (2), a synthesis gas consisting of 1 $Nm^3$ carbon monoxide and 2 $Nm^3$ hydrogen is obtained. The gross calorific value of the synthesis gas is 9,120 kcal, and the increase of heat quantity is 970 kcal. The rate of heat quantity increase (the increase of heat quantity is divided by the gross calorific value of dimethyl ether, and multiplied by 100) is calculated 11.9%.

Besides, dimethyl ether has already been utilized as a propellant for sprays, and confirmed that its toxicity is very small compared with methanol.

In the method of the invention, it is preferable to give the reaction heat necessary for reforming dimethyl ether by the medium, low temperature waste heat at 200 to 500° C. generated in a iron manufacturing factory or an electricity generation plant. For example, by using the sensible heat of the exhaust gas of a cooler generated in a sintering factory of an iron manufacturing factory, or by utilizing the exhaust gas of gas turbines in an electricity generation plant, an increase of the calorific value corresponding to the heat quantity of the reforming can be obtained in the produced reformed gas. Furthermore, the reforming of dimethyl ether proceeds at a temperature of 200 to 500° C. by the presence of the above catalyst, and is suitable for the recovery of the medium, low temperature waste heat.

The reformed gas of dimethyl ether is a gaseous fuel comprising mainly hydrogen or hydrogen and carbon monoxide, and is used as a fuel for an engine for electricity generation, such as a gas turbine. As the method of combustion, a low temperature combustion, such as catalytic combustion and dilute gas combustion, is also possible as well as normal combustion, and in this case, the retardation of nitrogen oxides generation can be expected.

The combustion conditions may be similar to the conventional conditions using LNG or LPG.

Iron ore and recovered scrap iron can be reduced by using synthesis gas or hydrogen gas obtained by reforming dimethyl ether using the catalyst of the invention.

Heretofore, in the method of manufacturing reduced iron by reducing iron ore, some methods of producing synthesis gas or hydrogen gas, which is a reducing gas, are known.

For example, there are (1) gasification of coal, (2) steam reforming of hydrocarbons using natural gas, LPG, naphtha or the like as the raw material, (3) partial oxidation of hydrocarbons using natural gas, LPG, naphtha, heavy-duty oil or the like as the raw material, and so on.

However, the above coal gasification of (1) has a problem that a very complex and expensive coal gasification oven is necessary, and the apparatus becomes a large scale plant. The steam reforming of hydrocarbons of (2) has a problem that a special reforming oven is necessary because of requiring a high temperature of 700 to 1200° C. for the reaction to proceed due to its great endothermic reaction, and the catalyst to be used is required to have a high heat resistance. The partial oxidation of the hydrocarbon of (3) has a problem that a special partial oxidation oven is necessary because of requiring a high temperature of 1200 to 1500° C., the treatment of a large quantity of soot generated with the reaction proceeding is a problem, and in the case of using a catalyst, the catalyst is deteriorated by the deposition of a large quantity of carbonaceous material on the surface of the catalyst.

The inventors devised a method of producing synthesis gas or hydrogen gas by reforming dimethyl ether using the catalyst of the invention, and a method of reducing iron ore and recovered scrap iron using the gas.

The above method includes a method of manufacturing reduced iron which comprises reforming dimethyl ether to produce synthesis gas or hydrogen gas by adding water vapor or carbon dioxide gas to dimethyl ether followed by catalyzing, and reducing iron ore or recovered scrap iron, a. method of manufacturing reduced iron as described above wherein the reforming of dimethyl ether is carried out using an exhaust gas containing water vapor and carbon dioxide gas generated by reducing iron ore or recovered scrap iron, and a method of manufacturing reduced iron as described above wherein the sensible heat of an exhaust gas generated by reducing iron ore or recovered scrap iron for heating the reforming of dimethyl ether, and uses an apparatus for manufacturing reduced iron which comprises a reformer packed with a catalyst for reacting dimethyl ether with water vapor or carbon dioxide gas to produce synthesis gas or hydrogen gas, and one reducing furnace charged with iron ore or recovered scrap iron, wherein they are connected so as to supply the synthesis gas or hydrogen gas produced in the reformer to the reducing furnace.

As to the reducing furnace of iron ore or recovered scrap iron, the type is not especially limited, and any known type of shaft type furnace, kiln type furnace, fluidized bed type furnace or rotary kiln type furnace is usable.

The reducing conditions may be similar to the conventional method, at a temperature of about 800 to 1,000° C., at a pressure of about 1 to 10 atmospheric pressures, for a period of about 2 to 8 hours.

In the invention, it is preferable to use the water vapor and carbon dioxide gas contained in the exhaust gas generated by reducing iron ore for a part or the whole of the water vapor or carbon dioxide. The composition of the exhaust gas is about 0 to 5 vol. % of water vapor, about 0 to 5 vol. % of carbon dioxide gas, about 0 to 5 vol. % of nitrogen and about 0 to 1 vol. % of oxygen, and the temperature of the medium, low temperature exhaust gas is about 300 to 500° C. at the exit of the reducing furnace.

EXAMPLES

Examples 1–4

An aqueous solution of 91 g cupric nitrate (Cu$(NO_3)_2.3H_2O$), 73 g zinc nitrate (Zn$(NO_3)_2.6H_2O$) and 368 g aluminum nitrate (Al$(NO_3)_3.9H_2O$) dissolved in about 2 l demineralized water and an aqueous solution of about 250 g sodium carbonate ($Na_2CO_3$) dissolved in about 2 l demineralized water were introduced dropwise into a stainless steel container containing about 5 l deminerailized water kept at about 80° C. for about 2 hours, while adjusting the pH to 8.0±0.5. After the introduction, maturing was carried out for about 1 hour with leaving as it is. While, the pH was adjusted to 8.0±0.5 by adding dropwise about 1 mol/l nitric acid aqueous solution or about 1 mol/l sodium carbonate aqueous solution. Subsequently, produced precipitates were filtered, and washed with demineralized water until nitrate ion was not detected in the washed solution. The cake thus obtained was dried at 120° C. for 24 hours, and sintered at 350° C. for 5 hours in air. Furthermore, the sintered matter was sieved to collect 20 to 40 mesh factions to obtain the object catalyst.

The composition of the obtained catalyst was $CuO:ZnO:Al_2O_3=30:20:50$ (weight ratio).

Example 5–8

A catalyst was prepared according to the same method as Examples 1–4, except that 105 g chromium nitrate (Cr $(NO_3)_2 \cdot 3H_2O$) was used instead of zinc nitrate.

The composition of the obtained catalyst was $CuO:Cr_2O_3:Al_2O_3=30:20:50$ (weight ratio).

Reaction Method

A prescribed amount of the above catalyst was packed in a stainless steel reaction tube having an inside diameter of 20 mm. A prescribed amount of dimethyl ether and carbon dioxide were supplied to the reaction tube, and the reaction was carried out at a prescribed temperature.

The reaction products and unreacted materials obtained by the above operations were analyzed by gas chromatography.

Reaction Conditions and Experimental Results

The reaction conditions and experimental results are shown in Tables 2 and 3.

$$\text{Synthesis gas yield}(\%) = \frac{1/6 \times (\text{CO producing rate} + \text{H}_2 \text{ producing rate})}{\text{Dimethyl ether supply rate}} \times 100$$

$$\text{Hydrocarbon yield}(\%) = \frac{\sum [n/2 \times \text{Hydrocarbon producing rate}]}{\text{Dimethyl ether supply rate}} \times 100$$

n: number of carbon atoms
All units of each rate are [mol/g-cat·h]

TABLE 2

|  | Example 1 | Example 2 | Example 3 | Example 4 |
|---|---|---|---|---|
| Catalyst (Weight ratio) Conditions | $CuO$—$ZnO$—$Al_2O_3$ (30:20:50) | | | |
| Temperature (° C.) | 250 | 300 | 350 | 300 |
| $CO_2$/Dimethyl Ether (Molar Ratio) | 1 | 1 | 1 | 2 |
| Space Velocity ($h^{-1}$) | 5000 | 5000 | 5000 | 3000 |
| Results of Reaction | | | | |
| DME Conversion Rate (%) | 74.8 | 78.2 | 83.1 | 85.5 |
| Yield (%) | | | | |
| Synthesis Gas | 74.1 | 76.0 | 79.8 | 85.1 |
| Hydrocarbons | 0.7 | 2.2 | 3.7 | 0.4 |
| $H_2$/CO in Synthesis Gas (Molar Ratio) | 0.98 | 0.92 | 0.86 | 0.72 |

TABLE 3

|  | Example 5 | Example 6 | Example 7 | Example 8 |
|---|---|---|---|---|
| Catalyst (Weight ratio) Conditions | $CuO$—$ZnO$—$Al_2O_3$ (30:20:50) | | | |
| Temperature (° C.) | 250 | 300 | 350 | 300 |
| $CO_2$/Dimethyl Ether (Molar Ratio) | 1 | 1 | 1 | 2 |
| Space Velocity ($h^{-1}$) | 5000 | 5000 | 5000 | 3000 |
| Results of Reaction | | | | |
| DME Conversion Rate (%) | 69.3 | 73.5 | 77.4 | 80.7 |
| Yield (%) | | | | |
| Synthesis Gas | 69.0 | 72.1 | 75.6 | 80.6 |
| Hydrocarbons | 0.3 | 1.4 | 1.8 | 0.1 |
| $H_2$/CO in Synthesis Gas (Molar Ratio) | 0.99 | 0.95 | 0.91 | 0.89 |

DME: Dimethyl ether

Examples 9–11

An aqueous solution of 91 g cupric nitrate ($Cu(NO_3)_2 \cdot 3H_2O$), 39 g nickel nitrate ($Ni(NO_3)_2 \cdot 6H_2O$), 37 g zinc nitrate ($Zn(NO_3)_2 \cdot 6H_2O$) and 368 g aluminum nitrate ($Al(NO_3)_3 \cdot 9H_2O$) dissolved in about 2 l demineralized water and an aqueous solution of about 200 g sodium hydroxide dissolved in about 2 l demineralized water were introduced dropwise into a stainless steel container containing about 5 l demineralized water kept at about 60° C. for about 1 hours, while adjusting the pH to 8.0±0.5. After the introduction, maturing was carried out for about 1 hour with leaving as it is. The pH was adjusted to 8.0±0.5 by adding dropwise about 1 mol/l nitric acid aqueous solution or about 1 mol/l sodium hydroxide aqueous solution. Subsequently, the produced precipitates were filtered, and washed with demineralized water until nitrate ion was not detected in the washed solution. The cake thus obtained was dried at 120° C. for 24 hours, and sintered at 350° C. for 5 hours in air. Furthermore, the sintered matter was sieved to collect 20 to 40 mesh factions to obtain the object catalyst.

The composition of the obtained catalyst was $CuO:NiO:ZnO:Al_2O_3=30:10:10:50$ (weight ratio).

Example 12

A catalyst was prepared according to the same method as Examples 9–11, except that 53 g chromium nitrate ($Cr(NO_3)_2 \cdot 3H_2O$) was used instead of nickel nitrate.

The composition of the obtained catalyst was $CuO:Cr_2O_3:ZnO:Al_2O_3=30:10:10:50$ (weight ratio).

Example 13

A catalyst was prepared according to the same method as Examples 9–11, except that 33 g manganese nitrate ($Mn(NO_3)_2 \cdot 6H_2O$) was used instead of nickel nitrate.

The composition of the obtained catalyst was $CuO:MnO_2:ZnO:Al_2O_3=30:10:10:50$ (weight ratio).

Example 14

A catalyst was prepared according to the same method as Examples 9–11, except that 53 g chromium nitrate ($Cr(NO_3)_2 \cdot 3H_2O$) was used instead of zinc nitrate in Example 13.

The composition of the obtained catalyst was $CuO:Cr_2O_3:MnO_2:Al_2O_3=30:10:10:50$ (weight ratio).

Reaction Method

A prescribed amount of the above catalyst was packed in a stainless steel reaction tube having an inside diameter of 20 mm. A prescribed amount of dimethyl ether and water vapor were supplied to the reaction tube, and the reaction was carried out at a prescribed temperature.

The reaction products and unreacted materials obtained by the above operations were analyzed by gas chromatography.

Reaction Conditions and Experimental Results

The reaction conditions and experimental results are shown in Tables 4 and 5.

$$\text{Hydrogen yield} (\%) = \frac{1/6 \times (H_2 \text{ producing rate} - 2 \times CO \text{ producing rate}) + 1/4 \, CO \text{ producing rate}}{\text{Dimethyl ether supply rate}} \times 100$$

$$\text{Methanol yield} (\%) = \frac{1/2 \times \text{Methanol producing rate}}{\text{Dimethyl ether supply rate}} \times 100$$

$$\text{CO yield} (\%) = \frac{1/4 \times CO \text{ producing rate}}{\text{Dimethyl ether supply rate}} \times 100$$

All units of each rate are [mol/g-cat·h]

TABLE 4

| | Example 9 | Example 10 | Example 11 |
|---|---|---|---|
| Catalyst (Weight ratio) | CuO—ZnO—$Al_2O_3$ (30:10:10:50) | CuO—ZnO—$Al_2O_3$ (30:10:10:50) | CuO—ZnO—$Al_2O_3$ (30:10:10:50) |
| Conditions | | | |
| Temperature (° C.) | 200 | 250 | 300 |
| $CO_2$/Dimethyl Ether (Molar Ratio) | 10 | 10 | 10 |
| Space Velocity ($h^{-1}$) | 15000 | 15000 | 15000 |
| Results of Reaction | | | |
| DME Conversion Rate (%) | 83.3 | 98.1 | 100 |
| Yield (%) | | | |
| Hydrogen | 79.2 | 92.0 | 88.5 |
| Methanol | 2.5 | 3.8 | 6.2 |
| Hydrocarbons | 0.1 | 0.1 | 0.3 |
| CO | 1.5 | 2.2 | 4.9 |

TABLE 5

| | Example 12 | Example 13 | Example 14 |
|---|---|---|---|
| Catalyst (Weight ratio) | CuO—ZnO—$Al_2O_3$ (30:10:10:50) | CuO—ZnO—$Al_2O_3$ (30:10:10:50) | CuO—ZnO—$Al_2O_3$ (30:10:10:50) |
| Conditions | | | |
| Temperature (° C.) | 250 | 250 | 250 |
| $CO_2$/Dimethyl Ether (Molar Ratio) | 10 | 10 | 10 |
| Space Velocity ($h^{-1}$) | 15000 | 15000 | 15000 |
| Results of Reaction | | | |
| DME Conversion Rate (%) | 94.3 | 92.2 | 91.8 |
| Yield (%) | | | |
| Hydrogen | 86.4 | 85.1 | 84.6 |
| Methanol | 4.3 | 4.1 | 3.8 |

TABLE 5-continued

| | Example 12 | Example 13 | Example 14 |
|---|---|---|---|
| Hydrocarbons | 0.1 | 0.1 | 0.1 |
| CO | 3.5 | 2.9 | 3.3 |

Examples 15–17

An aqueous solution of 405 g iron nitrate ($Fe(NO_3)_3 \cdot 9H_2O$), 79 g chromium nitrate ($Cr(NO_3)_2 \cdot 3H_2O$) and 37 g aluminum nitrate ($Al(NO_3)_3 \cdot 9H_2O$) dissolved in about 2 l demineralized water and an aqueous solution of about 180 g sodium hydroxide dissolved in about 2 l demineralized water were introduced dropwise into a stainless steel container containing about 5 l demineralized water kept at about 80° C. for about 1 hour, while adjusting the pH to 8.0±0.5. After the introduction, maturing was carried out for about 1 hour with leaving as it is. While, the pH was adjusted to 8.0±0.5 by adding dropwise about 1 mol/l nitric acid aqueous solution or about 1 mol/l sodium hydroxide aqueous solution. Subsequently, produced precipitates were filtered, and washed with demineralized water until nitrate ion was not detected in the washed solution. The cake thus obtained was dried at 120° C. for 24 hours, and sintered at 350° C. for 5 hours in air. Furthermore, the sintered matter was sieved to collect 20 to 40 mesh factions to obtain the object catalyst.

The composition of the obtained catalyst was $Fe_2O_3:Cr_2O_3:Al_2O_3=80:15:5$ (weight ratio).

Example 18–20

A catalyst was prepared according to the same method as Examples 15–17, except that 55 g zinc nitrate ($Zn(NO_3)_2 \cdot 6H_2O$) was used instead of chromium nitrate.

The composition of the obtained catalyst was $CuO:ZnO:Al_2O_3=80:15:5$ (weight ratio).

Reaction Method

A prescribed amount of the above catalyst was packed in a stainless steel reaction tube having an inside diameter of 20 mm. A prescribed amount of dimethyl ether and water vapor were supplied to the reaction tube, and the reaction was carried out at a prescribed temperature.

The reaction products and unreacted materials obtained by the above operations were analyzed by gas chromatography.

Reaction Conditions and Experimental Results

The reaction conditions and experimental results are shown in Tables 6 and 7.

TABLE 6

| | Example 15 | Example 16 | Example 17 |
|---|---|---|---|
| Catalyst (Weight ratio) | $Fe_2O_3$—$Cr_2O_3$—$Al_2O_3$ (80:15:5) | | |
| Conditions | | | |
| Temperature (° C.) | 300 | 350 | 400 |
| $CO_2$/Dimethyl Ether (Molar Ratio) | 10 | 10 | 10 |
| Space Velocity ($h^{-1}$) | 25000 | 25000 | 25000 |

TABLE 6-continued

| | Example 15 | Example 16 | Example 17 |
|---|---|---|---|
| Results of Reaction | | | |
| DME Conversion Rate (%) | 93.7 | 100 | 100 |
| Yield (%) | | | |
| Hydrogen | 91.9 | 95.8 | 93.6 |
| Methanol | 0.1 | 0.1 | 0.2 |
| Hydrocarbons | 0.2 | 0.9 | 1.9 |
| CO | 1.5 | 3.2 | 4.3 |

TABLE 7

| | Example 18 | Example 19 | Example 20 |
|---|---|---|---|
| Catalyst (Weight ratio) | $Fe_2O_3$—ZnO—$Al_2O_3$ (80:15:5) | | |
| Conditions | | | |
| Temperature (° C.) | 300 | 350 | 400 |
| $CO_2$/Dimethyl Ether (Molar Ratio) | 10 | 10 | 10 |
| Space Velocity ($h^{-1}$) | 25000 | 25000 | 25000 |
| Results of Reaction | | | |
| DME Conversion Rate (%) | 89.1 | 100 | 100 |
| Yield (%) | | | |
| Hydrogen | 87.6 | 94.0 | 92.1 |
| Methanol | 0.1 | 0.1 | 0.1 |
| Hydrocarbons | 0.1 | 1.3 | 1.1 |
| CO | 1.3 | 4.6 | 6.7 |

Examples 21–28

49.4 g cobalt acetate ($Co(NO_3)_2 \cdot 6H_2O$) was dissolved in about 300 ml demineralized water, and furthermore, 90 g γ-alumina ("N612", Nikldi Kagaku) was put in the aqueous solution, followed by evaporating to dryness. The matter was dried in air at 120° C. for 24 hours, and sintered at 500° C. for 3 hours in air. Subsequently, it was treated in hydrogen current at 500° C. for 3 hours to obtain the catalyst.

The composition of the obtained catalyst was $Co:Al_2O_3$= 10:90 (weight ratio).

Reaction Method

A prescribed amount of the above catalyst was packed in a stainless steel reaction tube having an inside diameter of 20 mm. A prescribed amount of dimethyl ether and water vapor and/or carbon dioxide were supplied to the reaction tube, and the reaction was carried out at a prescribed temperature.

The reaction products and unreacted materials obtained by the above operations were analyzed by gas chromatography.

Reaction Conditions and Experimental Results

The reaction conditions and experimental results are shown in Tables 8 and 9.

$$CO_2 \text{ yield}(\%) = \frac{1/2 \times CO_2 \text{ producing rate}}{\text{Dimethyl ether supply rate}} \times 100$$

All units of each rate are [mol/g-cat·h]

TABLE 8

| | Example 21 | Example 22 | Example 23 | Example 24 |
|---|---|---|---|---|
| Reaction Conditions | | | | |
| Temperature (° C.) | 250 | 300 | 350 | 400 |
| $H_2O$/Dimethyl Ether (Molar Ratio) | 4 | 4 | 4 | 4 |
| $CO_2$/Dimethyl Ether (Molar Ratio) | 0 | 0 | 0 | 0 |
| Space Velocity ($h^{-1}$) | 8000 | 8000 | 8000 | 8000 |
| Results of Reaction | | | | |
| DME Conversion Rate (%) | 93.8 | 100 | 100 | 100 |
| Yield (%) | | | | |
| Synthesis Gas | 84.6 | 91.8 | 92.0 | 88.8 |
| Methanol | 0.3 | 0.3 | 0.5 | 0.9 |
| Hydrocarbons | 0.4 | 1.1 | 3.1 | 6.5 |
| $CO_2$ | 8.5 | 6.8 | 4.4 | 3.6 |
| $H_2$/CO in Synthesis Gas (Molar Ratio) | 2.63 | 2.45 | 2.36 | 2.22 |

TABLE 9

| | Example 25 | Example 26 | Example 27 | Example 28 |
|---|---|---|---|---|
| Reaction Conditions | | | | |
| Temperature (° C.) | 300 | 400 | 500 | 350 |
| $H_2O$/Dimethyl Ether (Molar Ratio) | 0 | 0 | 0 | 2 |
| $CO_2$/Dimethyl Ether (Molar Ratio) | 1 | 1 | 1 | 0.5 |
| Space Velocity ($h^{-1}$) | 5000 | 5000 | 5000 | 5000 |
| Results of Reaction | | | | |
| DME Conversion Rate (%) | 83.7 | 100 | 100 | 96.8 |
| Yield (%) | | | | |
| Synthesis Gas | 80.1 | 88.4 | 84.1 | 90.4 |
| Methanol | 0 | 0 | 0 | 0.6 |
| Hydrocarbons | 3.6 | 8.9 | 15.9 | 2.5 |
| $CO_2$ | — | — | — | 3.3 |
| $H_2$/CO in Synthesis Gas (Molar Ratio) | 0.96 | 0.88 | 0.61 | 1.53 |

Examples 29, 30

6 ml hydrochloric acid and 8.33 g palladium chloride ($PdCl_2$) were dissolved in about 500 ml demineralized water, and 100 g zinc oxide (guaranteed reagent, Kanto Kagaku) was put in the aqueous solution, followed by evaporating to dryness. The matter was dried in air at 120° C. for 24 hours, and further sintered in air at 500° C. for 3 hours. Subsequently, this matter was put in an aqueous solution of 10 g sodium hydroxide dissolved in about 1,000 ml demineralized water, and treated at 50° C. with heating for about 1 hour. Then, it was washed until chloride ions were not detected, and dried at 120° C. for 24 hours. Furthermore, this matter was graded to 20 to 40 mesh by compression molding, and treated in a hydrogen current at 500° C. for 3 hours to obtain the catalyst.

The composition of the obtained catalyst was Pd:ZuO= 5:100 (weight ratio).

Examples 31, 32

A catalyst was prepared according to the same method as Examples 29, 30, except that cerium oxide (guaranteed reagent, Kanto Kagaku) was used instead of zinc oxide.

The composition of the obtained catalyst was $Pd:CeO_2=$ 5:100 (weight ratio).

Examples 33, 34

6 ml hydrochloric acid and 8.33 g palladium chloride ($PdCl_2$) were dissolved in about 500 ml demineralized water, and 100 g zinc γ-alumina ("N612", Nikld Kagaku) was put in the aqueous solution, followed by evaporating to dryness. The matter was dried in air at 120° C. for 24 hours, and further sintered in air at 500° C. for 3 hours. Subsequently, this matter was put in an aqueous solution of 50 g sodium hydroxide dissolved in about 1,000 ml demineralized water, and treated at 50° C. with heating for about 1 hour. Then, it was separated without washing, and dried. Furthermore, this matter was graded to 20 to 40 mesh by compression molding, and treated in a hydrogen current at 500° C. for 3 hours to obtain the catalyst.

The composition of the obtained catalyst was $Pd:Na_2O:Al_2O_3=5:0.4:100$ (weight ratio).

Examples 35, 36

6 ml hydrochloric acid and 8.33 g palladium chloride ($PdCl_2$) were dissolved in about 500 ml demineralized water, and 100 g silica gel ("ID", Fuji Davidson Kagaku) was put in the aqueous solution, followed by evaporating to dryness. The matter was dried in air at 120° C. for 24 hours, and further sintered in air at 500° C. for 3 hours. Subsequently, this matter was put in an aqueous solution of 10 g calcium hydroxide dissolved in about 1,000 ml demineralized water, and treated at 50° C. with heating for about 1 hour. Then, it was washed, followed by drying. Furthermore, about 80 g of this matter was put in an aqueous solution of 6.6 g calcium hydroxide dissolved in about 200 ml demineralized water, and evaporated to dryness, followed by drying. Furthermore, this matter was graded to 20 to 40 mesh by compression molding, and treated in a hydrogen current at 500° C. for 3 hours to obtain the catalyst.

The composition of the obtained catalyst was $Pd:CaO:SiO_2=5:5:100$ (weight ratio).

Reaction Method

A prescribed amount of the above catalyst was packed in a stainless steel reaction tube having an inside diameter of 20 mm. A prescribed amount of dimethyl ether and water vapor and/or carbon dioxide were supplied to the reaction tube, and the reaction was carried out at a prescribed temperature.

The reaction products and unreacted materials obtained by the above operations were analyzed by gas chromatography.

Reaction Conditions and Experimental Results

The reaction conditions and experimental results are shown in Tables 10 and 11.

TABLE 10

|  | Example 29 | Example 30 | Example 31 | Example 32 |
|---|---|---|---|---|
| Catalyst (weight ratio) | Pd—ZnO (5:100) | | Pd—CeO$_2$ (5:100) | |
| Reaction Conditions | | | | |
| Temperature (° C.) | 300 | 350 | 300 | 350 |
| H$_2$O/Dimethyl Ether (Molar Ratio) | 5 | 0 | 5 | 0 |
| CO$_2$/Dimethyl Ether (Molar Ratio) | 0 | 1 | 0 | 1 |
| Space Velocity (h$^{-1}$) | 12000 | 7000 | 12000 | 7000 |
| Results of Reaction | | | | |
| DME Conversion Rate (%) | 99.7 | 89.4 | 91.4 | 90.2 |
| Yield (%) | | | | |
| Synthesis Gas | 93.6 | 87.2 | 83.4 | 87.6 |
| Methanol | 0.2 | 0 | 0.3 | 0 |
| Hydrocarbons | 2.8 | 2.2 | 3.3 | 2.6 |
| CO$_2$ | 3.1 | — | 4.4 | — |
| H$_2$/CO in Synthesis Gas (Molar Ratio) | 2.46 | 0.95 | 2.20 | 0.84 |

TABLE 11

|  | Example 33 | Example 34 | Example 35 | Example 36 |
|---|---|---|---|---|
| Catalyst (weight ratio) | Pd—Na$_2$O—Al$_2$O$_3$ (5:0.4:100) | | Pd—CaO—SiO$_2$ (5:5:100) | |
| Reaction Conditions | | | | |
| Temperature (° C.) | 300 | 350 | 300 | 350 |
| H$_2$O/Dimethyl Ether (Molar Ratio) | 5 | 0 | 5 | 0 |
| CO$_2$/Dimethyl Ether (Molar Ratio) | 0 | 1 | 0 | 1 |
| Space Velocity (h$^{-1}$) | 12000 | 7000 | 12000 | 7000 |
| Results of Reaction | | | | |
| DME Conversion Rate (%) | 88.9 | 84.9 | 95.1 | 73.8 |
| Yield (%) | | | | |
| Synthesis Gas | 79.5 | 83.7 | 86.1 | 72.1 |
| Methanol | 0.1 | 0 | 0.1 | 0.1 |
| Hydrocarbons | 4.1 | 1.2 | 5.1 | 1.7 |
| CO$_2$ | 5.2 | — | 3.8 | — |
| H$_2$/CO in Synthesis Gas (Molar Ratio) | 2.38 | 0.88 | 2.51 | 0.89 |

Examples 37–42

0.777 g iridium chloride ($IrCl_3$) was dissolved in about 300 ml demineralized water, and furthermore, 99.5 g γ-alumina ("A10-4", Shokubai Gakkai) was put in the aqueous solution, followed by evaporating to dryness. The matter was dried in air at 120° C. for 24 hours, and sintered at 500° C. for 3 hours in air. Subsequently, it was treated in a hydrogen current at 500° C. for 3 hours to obtain the catalyst.

The composition of the obtained catalyst was $Ir:Al_2O_3=0.5:99.5$ (weight ratio).

Reaction Method

A prescribed amount of the above catalyst was packed in a stainless steel reaction tube having an inside diameter of 20 mm. A prescribed amount of dimethyl ether and water vapor were supplied to the reaction tube, and the reaction was carried out at a prescribed temperature.

The reaction products and unreacted materials obtained by the above operations were analyzed by gas chromatography.

Reaction Conditions and Experimental Results

The reaction conditions and experimental results are shown in Tables 12 and 13.

TABLE 12

|  | Example 37 | Example 38 | Example 39 |
|---|---|---|---|
| Catalyst (weight ratio) | | Ir—$Al_2O_3$ (0.5:99.5) | |
| Conditions | | | |
| Temperature (° C.) | 350 | 400 | 450 |
| $H_2O$/Dimethyl Ether (Molar Ratio) | 1 | 1 | 1 |
| Space Velocity ($h^{-1}$) | 10000 | 10000 | 10000 |
| Results of Reaction | | | |
| DME Conversion Rate (%) | 18.7 | 40.2 | 98.7 |
| Yield (%) | | | |
| Synthesis Gas | 4.7 | 14.5 | 73.0 |
| Methanol | 14.0 | 13.7 | 2.9 |
| Hydrocarbons | 0 | 12.1 | 22.8 |
| $CO_2$ | 0 | 0 | 0 |

TABLE 13

|  | Example 40 | Example 41 | Example 42 |
|---|---|---|---|
| Catalyst (weight ratio) | | Ir—$Al_2O_3$ (0.5:99.5) | |
| Conditions | | | |
| Temperature (° C.) | 450 | 450 | 450 |
| $H_2O$/Dimethyl Ether (Molar Ratio) | 3 | 5 | 10 |
| Space Velocity ($h^{-1}$) | 10000 | 10000 | 10000 |
| Results of Reaction | | | |
| DME Conversion Rate (%) | 98.0 | 97.3 | 99.5 |
| Yield (%) | | | |
| Synthesis Gas | 83.2 | 89.5 | 95.6 |
| Methanol | 1.1 | 0.3 | 0.2 |
| Hydrocarbons | 13.7 | 7.5 | 3.7 |
| $CO_2$ | 0 | 0 | 0 |

Examples 43–48

0.863 g platinum chloride ($PtCl_4$) was dissolved in about 300 ml 10 wt. % hydrochloric acid aqueous solution, and furthermore, 99.5 g γ-alumina ("ALO-4", Shokubai Gakkai) was put in the aqueous solution, followed by evaporating to dryness. The matter was dried in air at 120° C. for 24 hours, and sintered at 500° C. for 3 hour in air. Subsequently, it was treated in a hydrogen current at 500° C. for 3 hours to obtain the catalyst.

The composition of the obtained catalyst was Pt:$Al_2O_3$= 0.5:99.5 (weight ratio).

Reaction Method

A prescribed amount of the above catalyst was packed in a stainless steel reaction tube having an inside diameter of 20 mm. A prescribed amount of dimethyl ether and water vapor were supplied to the reaction tube, and the reaction was carried out at a prescribed temperature.

The reaction products and unreacted materials obtained by the above operations were analyzed by gas chromatography.

Reaction Conditions and Experimental Results

The reaction conditions and experimental results are shown in Tables 14 and 15.

TABLE 14

|  | Example 43 | Example 44 | Example 45 |
|---|---|---|---|
| Catalyst (weight ratio) | | Pt—$Al_2O_3$ (0.5:99.5) | |
| Conditions | | | |
| Temperature (° C.) | 300 | 350 | 400 |
| $H_2O$/Dimethyl Ether (Molar Ratio) | 1 | 1 | 1 |
| Space Velocity ($h^{-1}$) | 10000 | 10000 | 10000 |
| Results of Reaction | | | |
| DME Conversion Rate (%) | 21.6 | 40.2 | 98.0 |
| Yield (%) | | | |
| Synthesis Gas | 7.1 | 19.3 | 52.9 |
| Methanol | 9.3 | 11.7 | 45.1 |
| Hydrocarbons | 2.2 | 12.5 | 0 |
| $CO_2$ | 3.0 | 0 | 0 |

TABLE 15

|  | Example 46 | Example 47 | Example 48 |
|---|---|---|---|
| Catalyst (weight ratio) | | Pt—$Al_2O_3$ (0.5:99.5) | |
| Conditions | | | |
| Temperature (° C.) | 400 | 400 | 400 |
| $H_2O$/Dimethyl Ether (Molar Ratio) | 3 | 5 | 10 |
| Space Velocity ($h^{-1}$) | 10000 | 10000 | 10000 |
| Results of Reaction | | | |
| DME Conversion Rate (%) | 96.6 | 95.9 | 97.6 |
| Yield (%) | | | |
| Synthesis Gas | 74.1 | 79.4 | 83.6 |
| Methanol | 18.7 | 11.4 | 4.3 |
| Hydrocarbons | 0 | 0 | 0 |
| $CO_2$ | 3.8 | 5.1 | 9.7 |

Examples 49–54

1.40 g rhodium nitrate ($Rh(NO_3)_3$) was dissolved in about 300 ml demineralized water, and furthermore, 99.5 g γ-alumina ("ALO-4", Shokubai Gakkai) was put in the aqueous solution, followed by evaporating to dryness. The matter was dried in air at 120° C. for 24 hours, and sintered at 500° C. for 3 hours in air. Subsequently, it was treated in a hydrogen current at 500° C. for 3 hours to obtain the catalyst.

The composition of the obtained catalyst was Rh:$Al_2O_3$= 0.5:99.5 (weight ratio).

Reaction Method

A prescribed amount of the above catalyst was packed in a stainless steel reaction tube having an inside diameter of 20 mm. A prescribed amount of dimethyl ether and water vapor dioxide were supplied to the reaction tube, and the reaction was carried out at a prescribed temperature.

The reaction products and unreacted materials obtained by the above operations were analyzed by gas chromatography.

Reaction Conditions and Experimental Results

The reaction conditions and experimental results are shown in Tables 16 and 17.

TABLE 16

|  | Example 49 | Example 50 | Example 51 |
|---|---|---|---|
| Catalyst (weight ratio) | | Rh—Al$_2$O$_3$ (0.5:99.5) | |
| Conditions | | | |
| Temperature (° C.) | 350 | 400 | 450 |
| H$_2$O/Dimethyl Ether (Molar Ratio) | 1 | 1 | 1 |
| Space Velocity (h$^{-1}$) | 10000 | 10000 | 10000 |
| Results of Reaction | | | |
| DME Conversion Rate (%) | 19.1 | 65.3 | 89.7 |
| Yield (%) | | | |
| Synthesis Gas | 7.4 | 40.5 | 65.5 |
| Methanol | 11.7 | 7.2 | 1.8 |
| Hydrocarbons | 0 | 17.6 | 22.4 |
| CO$_2$ | 0 | 0 | 0 |

TABLE 17

|  | Example 52 | Example 53 | Example 54 |
|---|---|---|---|
| Catalyst (weight ratio) | | Rh—Al$_2$O$_3$ (0.5:99.5) | |
| Conditions | | | |
| Temperature (° C.) | 400 | 400 | 400 |
| H$_2$O/Dimethyl Ether (Molar Ratio) | 3 | 5 | 10 |
| Space Velocity (h$^{-1}$) | 10000 | 10000 | 10000 |
| Results of Reaction | | | |
| DME Conversion Rate (%) | 72.1 | 88.6 | 90.9 |
| Yield (%) | | | |
| Synthesis Gas | 57.0 | 76.5 | 78.7 |
| Methanol | 3.1 | 1.3 | 0.5 |
| Hydrocarbons | 10.5 | 7.0 | 2.8 |
| CO$_2$ | 1.5 | 3.8 | 8.9 |

Examples 55–56

0.833 g palladium chloride (PdCl$_2$) was dissolved in 5 ml hydrochloric acid, and the volume was to be made about 500 ml by adding demineralized water. 99.5 g silica gel ("SIO-2", Shokubai Gakkai) was put in the aqueous solution, followed by evaporating to dryness. The matter was dried in air at 120° C. for 24 hours, and sintered at 500° C. for 3 hours in air. Subsequently, after grading to 20 to 40 mesh, it was treated in a hydrogen current at 500° C. for 3 hours. The composition of this matter Pd:Al$_2$O$_3$=0.5:99.5 (weight ratio). γ-alumina ("ALO-4", Shokubai Gakkai) graded to 20 to 40 mesh was mixed physically with this matter at a ratio by weight of 1:1 to obtain the catalyst.

Examples 60–64

0.833 g palladium chloride (PdCl$_2$) was dissolved in 5 ml hydrochloric acid, and the volume was made to be about 500 ml by adding demineralized water. 98.5 g silica gel ("SIO-4", Shokubai Gakkai) was put in the aqueous solution, followed by evaporating to dryness. The matter was dried in air at 120° C. for 24 hours, and sintered in air at 500° C. for 3 hours. Subsequently, the matter was put in an aqueous solution of 1.46 g potassium carbonate (K$_2$CO$_3$) dissolved in about 500 ml demineralized water, and evaporated to dryness. Then, the matter was dried in air at 120° C. for 24 hours, and sintered in air at 500° C. for 3 hours. Furthermore, after grading to 20 to 40 mesh, it was treated in a hydrogen current at 500° C. for 3 hours. The composition of this matter was Pd:K$_2$O:Al$_2$O$_3$=0.5:1.0:98.5 (weight ratio). γ-alumina ("ALO-4", Shokubai Gakkai) graded to 20 to 40 mesh was mixed physically with this matter at a ratio by weight of 1:1 to obtain the catalyst.

Examples 65–69

A catalyst was prepared according to the same method as Examples 55–59, except that titania ("TIO-4", Shokubai Gakkai) was used instead of silica gel.

Reaction Method

A prescribed amount of the above catalyst was packed in a stainless steel reaction tube having an inside diameter of 20 mm. A prescribed amount of dimethyl ether and water vapor and/or carbon dioxide were supplied to the reaction tube, and the reaction was carried out at a prescribed temperature.

The reaction products and unreacted materials obtained by the above operations were analyzed by gas chromatography.

Reaction Conditions and Experimental Results

The reaction conditions and experimental results are shown in Tables 18–20.

TABLE 18

|  | Example 55 | Example 56 | Example 57 | Example 58 | Example 59 |
|---|---|---|---|---|---|
| Catalyst (weight ratio) | | | Pd/SiO$_2$ + Al$_2$O$_3$ ((0.5:99.5):100) | | |
| Conditions | | | | | |
| Temperature (° C.) | 350 | 400 | 450 | 400 | 400 |
| H$_2$O/Dimethyl Ether (Molar Ratio) | 1 | 1 | 1 | 5 | 10 |
| Space Velocity (h$^{-1}$) | 10000 | 10000 | 10000 | 10000 | 10000 |
| Results of Reaction | | | | | |
| DME Conversion Rate (%) | 40.6 | 81.6 | 95.6 | 93.7 | 97.3 |
| Yield (%) | | | | | |
| Synthesis Gas | 22.7 | 48.1 | 40.2 | 81.5 | 76.2 |
| Methanol | 8.5 | 3.3 | 1.9 | 0.3 | 0.3 |
| Hydrocarbons | 9.3 | 30.2 | 53.5 | 10.7 | 16.4 |
| CO$_2$ | 0 | 0 | 0 | 1.2 | 4.4 |

TABLE 19

|  | Example 60 | Example 61 | Example 62 | Example 63 | Example 64 |
|---|---|---|---|---|---|
| Catalyst (weight ratio) | | | Pd—K$_2$O/SiO$_2$ + Al$_2$O$_3$ ((0.5:1.0:98.5):100) | | |
| Conditions | | | | | |
| Temperature (° C.) | 350 | 400 | 450 | 400 | 400 |
| H$_2$O/Dimethyl Ether (Molar Ratio) | 1 | 1 | 1 | 5 | 10 |
| Space Velocity (h$^{-1}$) | 10000 | 10000 | 10000 | 10000 | 10000 |

TABLE 19-continued

|  | Example 60 | Example 61 | Example 62 | Example 63 | Example 64 |
|---|---|---|---|---|---|
| Results of Reaction | | | | | |
| DME Conversion Rate (%) | 28.0 | 24.4 | 40.9 | 48.6 | 76.9 |
| Yield (%) | | | | | |
| Synthesis Gas | 4.5 | 5.6 | 8.2 | 42.1 | 72.7 |
| Methanol | 23.5 | 18.1 | 7.8 | 5.5 | 2.2 |
| Hydrocarbons | 0 | 0.7 | 24.9 | 0.1 | 0.1 |
| $CO_2$ | 0 | 0 | 0 | 0.4 | 1.9 |

TABLE 20

|  | Example 65 | Example 66 | Example 67 | Example 68 | Example 69 |
|---|---|---|---|---|---|
| Catalyst (weight ratio) | Pd—$TiO_2$ + $Al_2O_3$ ((0.5:99.5):100) | | | | |
| Conditions | | | | | |
| Temperature (° C.) | 350 | 400 | 450 | 400 | 400 |
| $H_2O$/Dimethyl Ether (Molar Ratio) | 1 | 1 | 1 | 5 | 10 |
| Space Velocity ($h^{-1}$) | 10000 | 10000 | 10000 | 10000 | 10000 |
| Results of Reaction | | | | | |
| DME Conversion Rate (%) | 23.4 | 29.5 | 46.8 | 69.9 | 83.5 |
| Yield (%) | | | | | |
| Synthesis Gas | 11.5 | 17.4 | 15.9 | 60.2 | 76.6 |
| Methanol | 2.8 | 8.0 | 12.6 | 4.6 | 1.1 |
| Hydrocarbons | 5.9 | 2.1 | 16.8 | 1.6 | 0.9 |
| $CO_2$ | 3.3 | 2.1 | 1.4 | 3.5 | 4.9 |

Examples 70–72

24.8 g nickel nitrate ($Ni(NO_3)_2 \cdot 6H_2O$) was dissolved in about 300 ml demineralized water, and furthermore, 95 g γ-alumina ("ALO-4", Shokubai Gakkai) was put in the aqueous solution, followed by evaporating to dryness. The matter was dried in air at 120° C. for 24 hours, and sintered at 500° C. for 3 hour in air. Subsequently, it was treated in hydrogen current at 500° C. for 3 hours to obtain the catalyst.

The composition of the obtained catalyst was Ni:$Al_2O_3$= 5:95 (weight ratio).

Examples 73–75

32.1 g nickel nitrate ($Ni(NO_3)_2 \cdot 6H_2O$) was dissolved in about 300 ml demineralized water, and furthermore, 90 g γ-alumina ("ALO-4", Shokubai Gakkai) was put in the aqueous solution, followed by evaporating to dryness. The matter was dried in air at 120° C. for 24 hours, and sintered at 500° C. for 3 hours in air. Subsequently, it was treated in a mixed gas current of hydrogen sulfide and hydrogen at a molar ratio of 1:1 at 500° C. for 3 hours to obtain the catalyst.

The composition of the obtained catalyst was NiS:$Al_2O_3$= 10:90 (weight ratio).

Reaction Method

A prescribed amount of the above catalyst was packed in a stainless steel reaction tube having an inside diameter of 20 mm. A prescribed amount of dimethyl ether and water vapor were supplied to the reaction tube, and the reaction was carried out at a prescribed temperature.

The reaction products and unreacted materials obtained by the above operations were analyzed by gas chromatography.

Reaction Conditions and Experimental Results

The reaction conditions and experimental results are shown in Tables 21 and 22.

TABLE 21

|  | Example 70 | Example 71 | Example 72 |
|---|---|---|---|
| Catalyst (weight ratio) | Ni—$Al_2O_3$ (5:95) | | |
| Conditions | | | |
| Temperature (° C.) | 350 | 400 | 450 |
| $H_2O$/Dimethyl Ether (Molar Ratio) | 1 | 1 | 1 |
| Space Velocity ($h^{-1}$) | 10000 | 10000 | 10000 |
| Results of Reaction | | | |
| DME Conversion Rate (%) | 31.4 | 69.7 | 91.0 |
| Yield (%) | | | |
| Synthesis Gas | 17.6 | 41.8 | 57.3 |
| Methanol | 10.0 | 5.6 | 0.9 |
| Hydrocarbons | 3.8 | 22.3 | 32.8 |
| $CO_2$ | 1.5 | 3.2 | 4.3 |

TABLE 22

|  | Example 73 | Example 74 | Example 75 |
|---|---|---|---|
| Catalyst (weight ratio) | NiS—$Al_2O_3$ (10:90) | | |
| Conditions | | | |
| Temperature (° C.) | 350 | 400 | 450 |
| $H_2O$/Dimethyl Ether (Molar Ratio) | 1 | 1 | 1 |
| Space Velocity ($h^{-1}$) | 10000 | 10000 | 10000 |
| Results of Reaction | | | |
| DME Conversion Rate (%) | 36.9 | 71.2 | 93.5 |
| Yield (%) | | | |
| Synthesis Gas | 27.0 | 65.5 | 90.7 |
| Methanol | 9.1 | 4.2 | 0.1 |
| Hydrocarbons | 0.8 | 1.5 | 2.8 |
| $CO_2$ | 0 | 0 | 0 |

Example 76

Using a cathode base plate made of porous lanthanum calcium manganite $La_{0.75}Ca_{0.25}MnO_3$, a solid electrolyte membrane of stabilized zirconia 8 mol % $Y_2O_3$—$ZrO_2$ was formed on the base plate, and a platinum anode was provided on the electrolyte membrane to complete a solid electrolyte-type fuel cell. The fuel cell was operated at 1,000° C., and a mixed gas of 4.7% dimethyl ether, 2.6% water vapor, the remainder Ar gas was directly supplied to be anode, and oxygen was supplied to the cathode as the oxidizing agent gas. Both electrodes were connected through a galvanostat, and electricity generation characteristics were investigated. As a comparison, hydrogen, which is ordinarilly used, was supplied to the anode instead of the mixed gas, and electricity generation characteristics thereof were also investigated.

Figure 3:
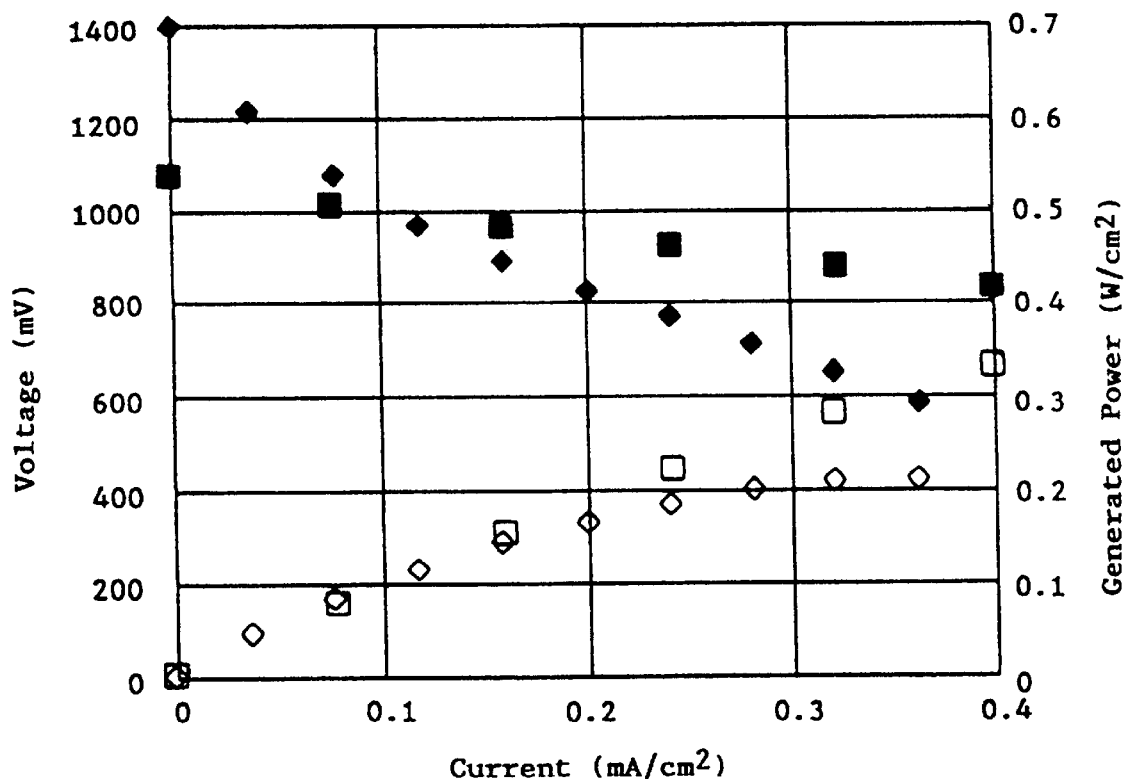
FIG. 3 shows electricity generation characteristics of the solid electrolyte-type fuel cell using dimethyl ether or hydrogen.

The results are shown in FIG. 3. In the figure, ♦ is dimethyl ether (voltage), ■ is hydrogen (voltage), ◊ is dimethyl ether (generated electric power), and □ is hydrogen (generated electric power), respectively.

It can be seen that, even by supplying dimethyl ether and water vapor directly to the anode, electricity generation can be conducted to the degree of no problem as a solid electrolyte-type fuel cell, although electric generation efficiency is slightly inferior to the case of hydrogen. Moreover, problems of electrode deterioration and the like did not occur.

Example 77

Figure 4:
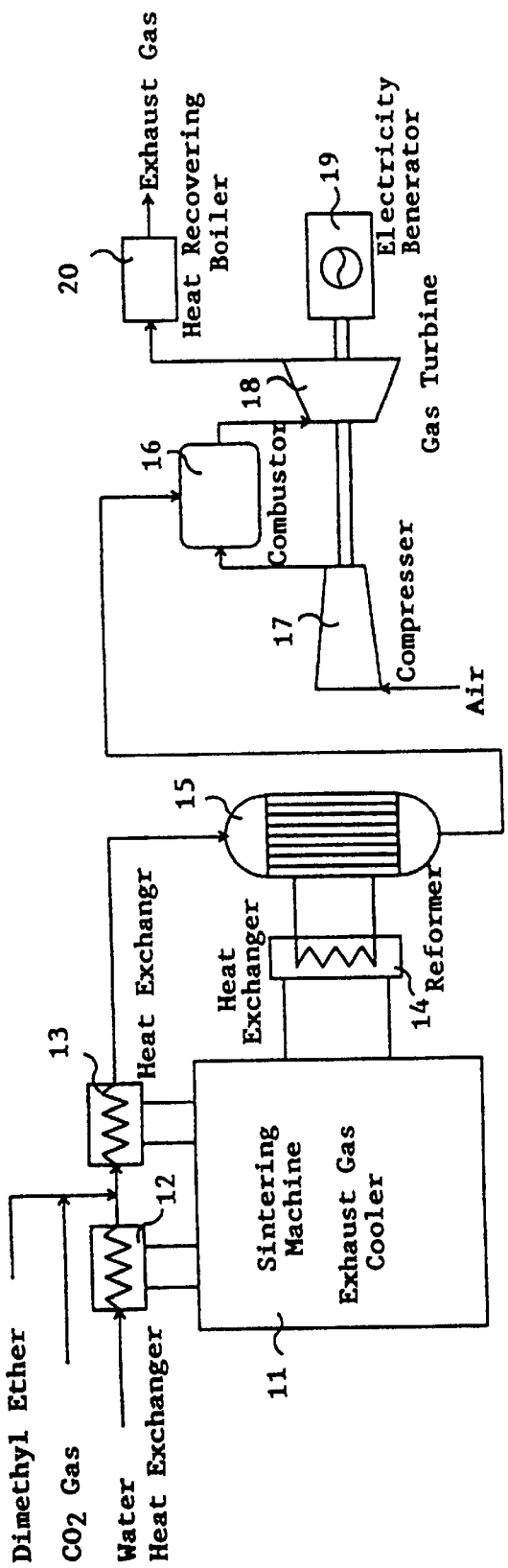
FIG. 4 is a flow sheet illustrating an engine electricity generation system using hydrogen or synthesis gas obtained by using the catalyst of the invention.

FIG. 4 is a flow sheet illustrating an example of the electricity generation method using the dimethyl ether reformed gas of the invention.

In a sintering machine cooler 11, sintered ore was air-cooled, the exhaust gas at 200 to 500° C. generated there was delivered to a heat exchanger 12 for heating water, a heat exchanger 13 for heating a raw gas material and a heat exchanger 14 for heating a heating medium. The heating medium heated by the sensible heat of the exhaust gas of the sintering machine cooler 11, is delivered to a dimethyl ether reformer 15. At the apparatus, a mixed gas consisting of dimethyl ether, steam and carbon dioxide gas, which has been previously heated by the sintering machine exhaust gas, is introduced into a plurality of reaction tubes arranged in the reformer 15. The inside of the reaction tubes is packed with dimethyl ether reforming catalyst, and by contacting the mixed gas consisting of dimethyl ether, steam and carbon dioxide gas with the catalyst, a mixed gas of carbon monoxide and hydrogen is produced. The inside temperature of the reformed 15 is, in general, in the temperature range of 200 to 500° C., although it varies according to the type of the catalyst to be packed. The produced reformed gas contains a small amount of unreacted dimethyl ether. However, dimethyl ether itself is fuel gas having a great calorific value, and accordingly, the reformer gas containing dimethyl ether has no problem as the fuel for the combustor 16 for the gas turbine. The obtained reformed gas is delivered to the combustor 16, and bums by the air for combustion supplied from a compressor 17. The exhaust gas generated in the combustor 16 is delivered to the gas turbine 18, and rotates an electricity generator 19 to generate electricity. The gas discharged from the gas turbine 18 is delivered to a gas turbine heat recovering boiler 20. The steam obtained in the gas turbine heat recovering boiler 20 is utilized as process steam in an iron manufacturing factory (not illustrated).

Generation Examples 1–4 and Comparative Generation Example

Using the dimethyl ether reformed gas obtained in a prescribed catalyst example, electricity generation tests were carried out by a simple open type gas turbine.

TABLE 23

|  | Generation Example 1 | Generation Example 2 | Generation Example 3 | Generation Example 4 | Comparative Generation |
|---|---|---|---|---|---|
| Condition |  |  |  |  |  |
| Reformed Gas | Example 2 | Example 5 | Example 10 | Example 27 | Comparative Reaction |
| Reformed Gas Temp. (° C.) | 337 | 334 | 329 | 342 | 320 |
| Exhaust Gas Temp. (° C.) | 570 | 561 | 547 | 584 | 530 |
| Results |  |  |  |  |  |
| Generating Efficiency (%) | 44.6 | 44.3 | 43.6 | 45.8 | 41.5 |

TABLE 24

|  | Comparative Reaction |
|---|---|
| Catalyst (wt. ratio) | CuO—ZnO—$Al_2O_3$ (30:20:50) |
| Conditions |  |
| Temperature (° C.) | 360 |
| $H_2O$/Methanol (Molar Ratio) | 2 |
| Space Velocity ($h^{-1}$) | 15000 |
| Results of Reaction |  |
| Methanol Conversion Rate (%) |  84.2 |
| Yield (%) |  |
| Hydrogen | 73.9 |
| $CO_2$ | 21.5 |
| CO | 4.6 |

Example 78

Figure 5:
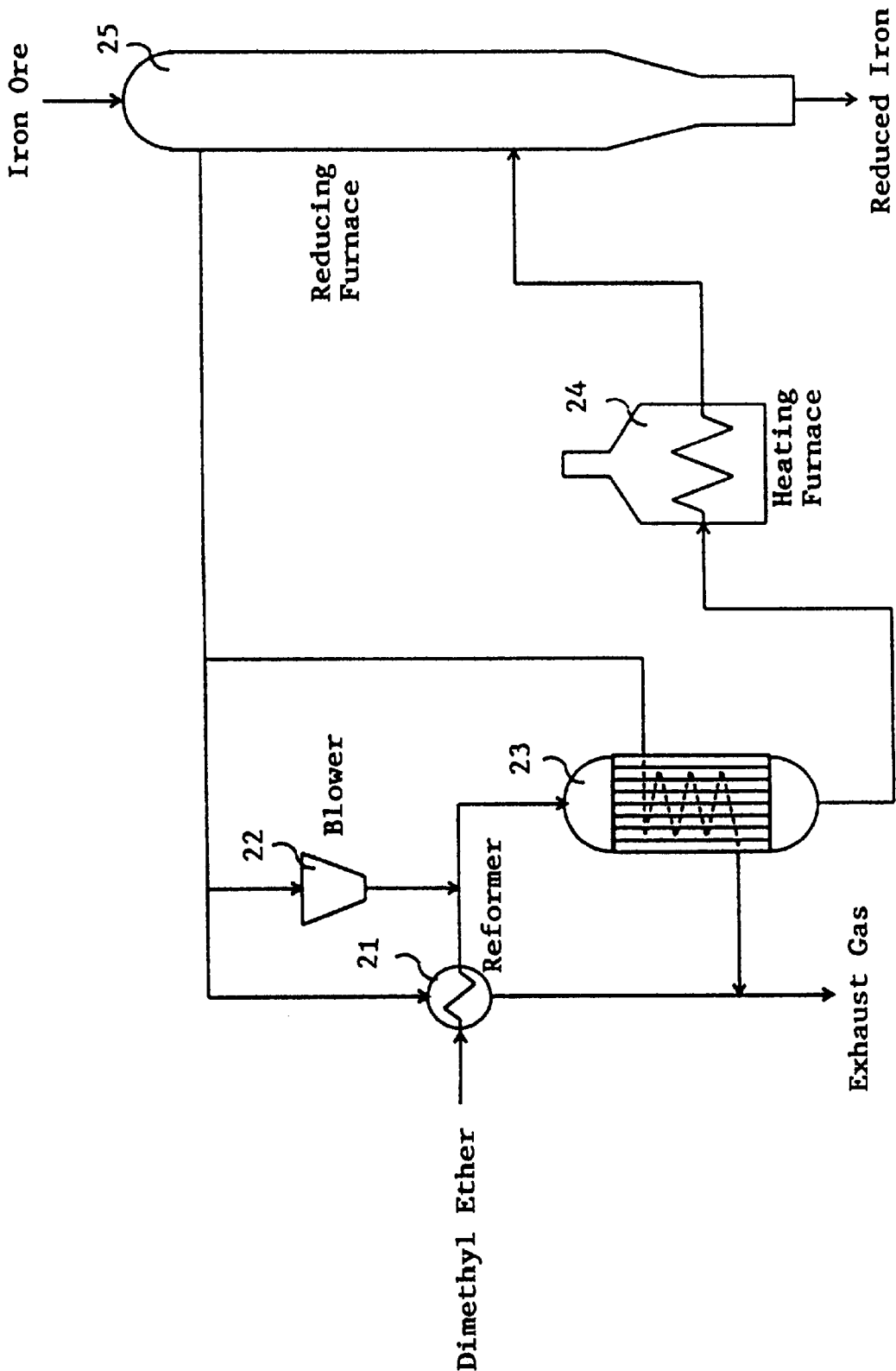
FIG. 5 is a flow sheet illustrating a general constitution of an iron ore reducing system using hydrogen or synthesis gas obtained by using the catalyst of the invention.

FIG. 5 is a flow sheet illustrating an example of the reducing method of iron ore using the dimethyl ether reformed gas of the invention.

Dimethyl ether is previously heated at an heat exchanger 21 by the exhaust gas at 200 to 500° C. after reducing iron ore, mixed with the exhaust gas comprising mainly steam and carbon dioxide gas after reducing iron ore supplied by a blower 22, and then, delivered to a dimethyl ether reformer 23. At the reformer 23, a dimethyl ether reforming catalyst is packed in a plurality of reaction tubes arranged therein, and the exhaust gas, after reducing the iron ore, is introduced to the outside of the reaction tubes for supplying heat for the endothermic reaction. By contacting the mixed gas consisting of dimethyl ether the exhaust gas after reducing iron ore with the catalyst in the reaction tubes, reformed gas comprising mainly carbon monoxide and hydrogen is produced. The inside temperature of the reformer 23 is, in general, in the temperature range of 200 to 500° C., although it varies according to the type of the packed catalyst. The obtained reformed gas is delivered to a heating furnace 24 to raise its temperature to 800 to 1000° C., and introduced into a reducing furnace 25. At the reducing furnace 25, iron ore is loaded from the upper part, and the iron ore is reduced by the reformed gas introduced from the middle bottom part, and the reduced iron is discharged from the under part.

Reduction Examples 1–6

A prescribed amount of iron ore pellets or clump ore having a grain diameter of 5 to 10 mm was loaded in a shaft-type reducing furnace. The dimethyl ether reformed gas obtained in a prescribed catalyst example was heated to a prescribed temperature, and a prescribed amount was streamed for a prescribed time to reduce the iron ore.

TABLE 25

|  | Reduction Example 1 | Reduction Example 2 | Reduction Example 3 | Reduction Example 4 | Reduction Example 5 | Reduction Example 6 |
| --- | --- | --- | --- | --- | --- | --- |
| Raw Material |  |  |  |  |  |  |
| Ore | Pellet | Clump Ore | Pellet | Pellet | Pellet | Pellet |
| Loaded Amount (kg) | 1 | 1 | 1 | 1 | 1 | 1 |
| Conditions |  |  |  |  |  |  |
| Reformed Gas | Catalyst Example 5 | Catalyst Example 5 | Catalyst Example 10 | Catalyst Example 27 | Catalyst Example 5 | Catalyst Example 5 |
| Reformed Gas Flow Rate ($Nm^3/h$) | 4 | 4 | 3 | 6 | 5 | 3 |
| Inlet Temp. (° C.) | 900 | 900 | 850 | 950 | 850 | 950 |
| Pressure (atm) | 1 | 1 | 1 | 1 | 1 | 1 |
| Time (h) | 3 | 3 | 2 | 3 | 2 | 3 |
| Results |  |  |  |  |  |  |
| Metallized Rate (%) | 92 | 92 | 94 | 93 | 91 | 91 |

Industrial Applicability

The catalyst of the invention can obtain hydrogen or synthesis gas in a high yield by reacting dimethyl ether and water vapor or carbon dioxide at a low temperature of 150 to 600° C. The hydrogen obtained in the invention has wide applications as various raw materials, and is useful for a fuel cell, fuel for electricity generation, reduction of iron ore, etc.

What is claimed is:

1. A method of producing synthesis gas comprising the step of contacting a mixed gas comprising dimethyl ether and carbon dioxide gas with a catalyst, the catalyst comprising copper or iron as an active component.

2. A fuel cell using dimethyl ether as fuel and a catalyst for producing hydrogen gas from a mixed gas comprising dimethyl ether and water vapor or carbon dioxide gas, which comprises copper, iron, cobalt, palladium, iridium, platinum, rhodium, or nickel as an active component.

3. A solid electrolyte fuel cell using amixed gas comprising dimethyl ether and water vapor as fuel gas and a catalyst for producing hydrogen gas from a mixed gas comprising dimethyl ether and water vapor or carbon dioxide gas, which comprises copper, iron, cobalt, palladium, iridium, platinum, rhodium, or nickel as an active component.

4. An electricity generation method using dimethyl ether reformed gas which comprises reforming dimethyl ether to produce synthesis gas or hydrogen gas by adding water vapor or carbon dioxide gas to the dimethyl ether and catalyzing them using a catalyst for producing hydrogen gas from a mixed gas comprising dimethyl ether and water vapor or carbon dioxide gas, which comprises copper, iron, cobalt, palladium, iridium, platinum, rhodium, or nickel as an active component, and using the produced gas as a fuel for an engine.

5. The electricity generation method as set forth in claim 4, which comprises reforming dimethyl ether utilizing waste heat in the range of 200 to 500° C.

6. An electricity generating apparatus which comprises a reformer loaded with a catalyst for producing hydrogen gas from a mixed gas comprising dimethyl ether and water vapor or carbon dioxide gas, which comprises copper, iron, cobalt, palladium, iridium, platinum, rhodium, or nickel as an active component, a combustor for burning the synthesis gas or hydrogen gas, and an electricity generator having a gas turbine rotated by the combustion exhaust gas generated in the combustor.

7. A method of manufacturing reduced iron which comprises reforming dimethyl ether to produce synthesis gas or hydrogen gas by adding water vapor or carbon dioxide gas to the dimethyl ether and catalyzing them using a catalyst for producing hydrogen gas from a mixed gas comprising dimethyl ether and water vapor or carbon dixoide gas, which comprises copper, iron, cobalt, palladium, iridium, platinum, rhodium, or nickel as an active component, and reducing iron ore with the produced gas.

8. The method of manufacturing reduced iron as set forth in claim 7, wherein the reforming of dimethyl ether is carried out using an exhaust gas containing water vapor and carbon dioxide gas obtained by reducing the iron ore.

9. The method of manufacturing reduced iron as set forth in claim 7, wherein sensible heat of an exhaust gas obtained by reducing the iron ore is utilized as a heating source of the dimethyl ether reforming.

10. A manufacturing apparatus of reduced iron which comprises a reformer loaded with a catalyst for producing hydrogen gas from a mixed gas comprising dimethyl ether and water vapor or carbon dioxide gas, which comprises copper, iron, cobalt, palladium, iridium, platinum, rhodium, or nickel as an active component, and a reducing furnace loaded with iron ore, the reducing furnace being connected with the reformer so that synthesis gas or hydrogen gas produced in the reformer is supplied to the reducing furnace.

* * * * *